(12) United States Patent
Tang et al.

(10) Patent No.: US 12,551,155 B1
(45) Date of Patent: Feb. 17, 2026

(54) ELECTROCARDIOGRAM SENSING AND PROCESSING

(71) Applicant: Arrowhead Center, Inc., Las Cruces, NM (US)

(72) Inventors: Wei Tang, Las Cruces, NM (US); Xiaochen Tang, Las Cruces, NM (US)

(73) Assignee: Arrowhead Center, Inc., Las Cruces, NM (US)

( * ) Notice: Subject to any disclaimer, the term of this patent is extended or adjusted under 35 U.S.C. 154(b) by 266 days.

(21) Appl. No.: 18/210,784

(22) Filed: Jun. 16, 2023

Related U.S. Application Data

(63) Continuation of application No. 16/711,266, filed on Dec. 11, 2019, now abandoned.

(60) Provisional application No. 62/778,156, filed on Dec. 11, 2018.

(51) Int. Cl.
| | |
|---|---|
| *A61B 5/352* | (2021.01) |
| *A61B 5/30* | (2021.01) |
| *A61B 5/304* | (2021.01) |
| *A61B 5/366* | (2021.01) |
| *H03F 3/45* | (2006.01) |
| *H03M 3/02* | (2006.01) |

(52) U.S. Cl.
CPC ............... *A61B 5/352* (2021.01); *A61B 5/30* (2021.01); *A61B 5/304* (2021.01); *A61B 5/366* (2021.01); *H03F 3/4526* (2013.01); *H03M 3/02* (2013.01)

(58) Field of Classification Search
None
See application file for complete search history.

(56) References Cited

U.S. PATENT DOCUMENTS

| | | |
|---|---|---|
| 4,308,524 A | 12/1981 | Harrison et al. |
| 4,448,196 A | 5/1984 | Money et al. |
| 4,567,883 A | 2/1986 | Langer |
| 5,014,284 A | 5/1991 | Langer et al. |
| 5,150,324 A | 9/1992 | Takasuka et al. |
| 5,200,750 A | 4/1993 | Fushiki et al. |

(Continued)

FOREIGN PATENT DOCUMENTS

| | | |
|---|---|---|
| CA | 2003428 | 12/1999 |
| CN | 205041393 | 2/2016 |

(Continued)

OTHER PUBLICATIONS

Vemishetty et al., Low Power Personalized ECG Based System Design Methodology for Remote Cardiac Health Monitoring, IEEE Access, vol. 4 (Year: 2016).*

(Continued)

*Primary Examiner* — Carl H Layno
*Assistant Examiner* — Manolis Pahakis
(74) *Attorney, Agent, or Firm* — Peacock Law P.C.; Justin R. Jackson; Daniel J. Berenger-Russell

(57) ABSTRACT

Real-time electrocardiogram ("ECG") monitoring system for wearable devices. Embodiments of the invention are based on parallel Delta modulator architecture with local maximum point and local minimum point algorithms to detect QRS and PT waves. The parallel Delta modulators preferably convert ECG signals to two channels of three-state Delta modulated bitstreams. Using embodiments of the invention, real-time PR and RT intervals, as well as ST segment measurements, can be achieved in long-term wearable ECG recording devices.

5 Claims, 24 Drawing Sheets

(56) References Cited

U.S. PATENT DOCUMENTS

| | | | |
|---|---|---|---|
| 5,301,677 A * | 4/1994 | Hsung | A61B 5/361 |
| | | | 600/518 |
| 5,343,420 A | 8/1994 | Murata et al. | |
| 5,349,353 A | 9/1994 | Zrilic | |
| 5,392,040 A | 2/1995 | Hayashi | |
| 5,990,818 A | 11/1999 | Mcgrath | |
| 6,150,969 A | 11/2000 | Melanson | |
| 6,285,306 B1 | 9/2001 | Zrilic | |
| 6,362,762 B1 | 3/2002 | Jensen et al. | |
| 6,437,718 B1 | 8/2002 | Oyama et al. | |
| 6,492,929 B1 | 12/2002 | Coffey et al. | |
| 6,668,035 B2 | 12/2003 | Han et al. | |
| 6,970,737 B1 | 11/2005 | Brodnick et al. | |
| 6,999,014 B2 * | 2/2006 | Oliaei | H03M 3/02 |
| | | | 341/138 |
| 7,018,339 B2 | 3/2006 | Birnbaum et al. | |
| 7,190,288 B2 | 3/2007 | Robinson et al. | |
| 7,245,246 B2 | 7/2007 | Ihs et al. | |
| 7,321,325 B2 | 1/2008 | Hsieh et al. | |
| RE40,424 E | 7/2008 | Han et al. | |
| 7,696,913 B2 | 4/2010 | Melanson | |
| 7,714,757 B2 * | 5/2010 | Denison | A61B 5/7203 |
| | | | 341/143 |
| 7,991,458 B2 | 8/2011 | Hardahl | |
| 8,164,491 B2 | 4/2012 | Cho et al. | |
| 8,193,845 B2 | 6/2012 | Jian et al. | |
| 8,204,580 B2 | 6/2012 | Kurzweil et al. | |
| 8,483,807 B2 | 7/2013 | Kurzweil et al. | |
| 8,542,138 B2 | 9/2013 | Galton et al. | |
| 8,581,763 B2 | 11/2013 | Niwa et al. | |
| 8,581,764 B2 | 11/2013 | Moue | |
| 8,598,858 B2 | 12/2013 | Kurokawa | |
| 8,755,877 B2 | 6/2014 | Zoica | |
| 8,798,725 B2 | 8/2014 | Mahmood et al. | |
| 8,842,030 B1 | 9/2014 | Fontaine et al. | |
| 8,849,381 B2 | 9/2014 | Lux et al. | |
| 9,050,007 B1 | 6/2015 | Brockway et al. | |
| 9,294,113 B2 | 3/2016 | Feizi-Khankandi et al. | |
| 9,419,642 B1 | 8/2016 | Nguyen | |
| 9,449,501 B2 * | 9/2016 | Grevious | A61N 1/37223 |
| 9,484,950 B1 | 11/2016 | Tang | |
| 9,559,719 B1 | 1/2017 | Kauffman et al. | |
| 9,681,814 B2 | 6/2017 | Galloway et al. | |
| 9,866,227 B1 | 1/2018 | Bresciani et al. | |
| 10,110,246 B1 | 10/2018 | Zrilic | |
| 10,135,459 B2 * | 11/2018 | Sharma | A61B 5/7203 |
| 10,284,223 B2 | 5/2019 | Ouzounov et al. | |
| 10,418,959 B2 | 9/2019 | Yuzuriha | |
| 2002/0077536 A1 | 6/2002 | Diab et al. | |
| 2003/0108143 A1 | 6/2003 | Han et al. | |
| 2003/0216906 A1 | 11/2003 | Norsworthy | |
| 2004/0171953 A1 | 9/2004 | Hemming et al. | |
| 2004/0223553 A1 | 11/2004 | Kumar | |
| 2004/0239537 A1 * | 12/2004 | Viswanathan ... | G11B 20/00007 |
| 2005/0068213 A1 | 3/2005 | Fontaine et al. | |
| 2005/0270201 A1 | 12/2005 | Maloberti et al. | |
| 2006/0229521 A1 | 10/2006 | Barr | |
| 2006/0229525 A1 * | 10/2006 | Barr | A61B 5/308 |
| | | | 600/523 |
| 2006/0235321 A1 | 10/2006 | Simske et al. | |
| 2007/0073266 A1 | 3/2007 | Chmiel et al. | |
| 2009/0021408 A1 | 1/2009 | Lee et al. | |
| 2009/0259672 A1 | 10/2009 | Garudadri et al. | |
| 2011/0050471 A1 | 3/2011 | Kumar | |
| 2011/0066053 A1 * | 3/2011 | Yazicioglu | A61B 5/30 |
| | | | 324/76.38 |
| 2011/0140940 A1 | 6/2011 | Cho et al. | |
| 2011/0148682 A1 | 6/2011 | Rigby et al. | |
| 2012/0097839 A1 | 4/2012 | Jung et al. | |
| 2012/0306689 A1 | 12/2012 | Yule et al. | |
| 2013/0050003 A1 | 2/2013 | Wang | |
| 2014/0114616 A1 | 4/2014 | Lee et al. | |
| 2014/0148714 A1 | 5/2014 | Mamaghanian et al. | |
| 2014/0163386 A1 * | 6/2014 | He | A61B 5/316 |
| | | | 327/51 |
| 2014/0368366 A1 | 12/2014 | Galton et al. | |
| 2014/0375488 A1 | 12/2014 | Stoops et al. | |
| 2015/0141857 A1 * | 5/2015 | Nallathambi | A61B 5/366 |
| | | | 600/509 |
| 2016/0106332 A1 * | 4/2016 | Takeshima | A61B 5/366 |
| | | | 600/509 |
| 2016/0120431 A1 | 5/2016 | Habte et al. | |
| 2016/0149586 A1 | 5/2016 | Roh et al. | |
| 2016/0322984 A1 | 11/2016 | Sundblad et al. | |
| 2016/0359499 A1 | 12/2016 | Bandyopadhyay | |
| 2017/0112401 A1 | 4/2017 | Rapin et al. | |
| 2018/0309460 A1 | 10/2018 | Bandyopadhyay et al. | |
| 2019/0020352 A1 | 1/2019 | Gutta et al. | |
| 2019/0199369 A1 | 6/2019 | Katayama | |
| 2019/0253069 A1 * | 8/2019 | Kim | H03M 3/496 |
| 2020/0001036 A1 | 1/2020 | Drakulic et al. | |

FOREIGN PATENT DOCUMENTS

| | | |
|---|---|---|
| EP | 1543770 | 6/2005 |
| EP | 2016894 | 1/2009 |
| EP | 2589332 | 5/2013 |
| ES | 2264871 B1 | 12/2007 |
| WO | 2005117467 | 12/2005 |
| WO | 2010119456 A2 | 10/2010 |
| WO | 2021243019 A1 | 12/2021 |
| WO | 2022212418 A1 | 10/2022 |

OTHER PUBLICATIONS

X. Tang, Q. Hu and W. Tang, "Analog to Digital Feature Converter based on Oversampling Modulators for ECG Delineation," 2019 IEEE 62nd International Midwest Symposium on Circuits and Systems (MWSCAS), Dallas, TX, USA, 2019, pp. 121-124, ePub Oct. 31, 2019 (Year: 2019).*

Hsu et al., A 1V Low Power Second-Order Delta-Sigma Modulator for Biomedical Signal Application, 35th Annual International Conference of the IEEE EMBS Osaka, Japan, Jul. 3-7, 2013 (Year: 2013).*

Pablo et al., Low Noise Front-End and ADC for Real-Time ECG System in CMOS Process,2019 IEEE 10th Latin American Symposium on Circuits & Systems (LASCAS), ePub Mar. 18, 2019 (Year: 2019).*

Agarwal, R. , et al., "Adaptive asynchronous analog to digital conversion for compressed biomedical sensing", Proc. IEEE Biomed. Circuits Syst. Conf., 2009, 69-72.

Agarwal, Ritika , et al., "Input-Feature Correlated Asynchronous Analog to Information Converter for ECG Monitoring", IEEE Trans. Biomed. Circuits Syst., vol. 5, No. 5, 2011, 459-467.

Aro, Aapo L., et al., "Prognostic significance of prolonged PR interval in the general population", Eur. Heart J., vol. 35, No. 2, 2013, 123-129.

Arzeno, Natalia M., et al., "Analysis of First-Derivative Based QRS Detection Algorithms", IEEE Trans. Biomed. Eng., vol. 55, No. 2, 2008, 478-484.

Assaad, Rida S., et al., "The Recycling Folded Cascode: A General Enhancement of the Folded Cascode Amplifier", IEEE J. Solid-State Circuits, vol. 44, No. 9, 2009, 2535-2542.

Bachler, Martin , et al., "Online and offline determination ofQT and PR interval and QRS duration in electrocardiography", Proc. Joint Int. Conf. Pervasive Comput. Netw. World, 2012, 1-15.

Barro, S. , et al., "Classifying multichannel ECG patterns with an adaptive neural network", IEEE Eng. Med. Biol. Mag., vol. 17, No. 1, 1998, 45-55.

Benjamin, Emelia J., et al., "Heart Disease and Stroke Statistics— 2017 Update", Circulation. 2017, vol. 135, 2017, e146-e603.

Bote, Jose Manuel, et al., "A Modular Low-Complexity ECG Delineation Algorithm for Real-Time Embedded Systems", IEEE Journal of Biomedical and Health Informatics, vol. 22, No. 2, 2017, 429-441.

(56) References Cited

OTHER PUBLICATIONS

Cheng, Susan, et al., "Long-term Outcomes in Individuals with a Prolonged PR Interval or First-Degree Atrioventricular Block", J. Amer. Med. Assoc., vol. 301, No. 24, 2009, 2571-2577.

Chuo, Yindar, et al., "Mechanically flexible wireless multisensor platform for human physical activity and vitals monitoring", IEEE Trans. Biomed. Circuits Syst., vol. 4, No. 5, 2010, 281-294.

Comert, Zafer, et al., "Determination of QT interval on synthetic electrocardiogram", Proc. 23nd Signal Process. Commun. Appl. Conf., 2015, 2569-2572.

Ferrari, Emile, et al., "The ECG in pulmonary embolism: Predictive value of negative T waves in precordial leads-80 case reports", Chest, vol. 111, No. 3, 1997, 537-543.

Goldberger, Ary L., et al., "PhysioBank, PhysioToolkit, and PhysioNet", Circulation, vol. 101, No. 23, 2000, e215-e220.

He, David DA, et al., "A 58 nW ECG ASIC with motion-tolerant heartbeat timing extraction for wearable cardiovascular monitoring", IEEE Transactions on Biomedical Circuits and Systems, vol. 9, No. 3, 2015, 370-376.

Hou, Phan Chee, et al., "An embedded delta modulator system for coding speech signals", Proc. 2nd Int. Conf. Electron. Des., 2014, 176-180.

Hu, Qisong, et al., "Asynchronous Communication for Wireless Sensors Using Ultra Wideband Impulse Radio", IEEE 58th International Midwest Symposium on Circuits and Systems (MWSCAS), 2015, 1-4.

Hu, Qisong, et al., "Integrated Asynchronous Ultrawideband Impulse Radio With Intrinsic Clock and Data Recovery", IEEE Microwave and Wireless Components Letters, vol. 27, No. 4, 2017, 416-418.

Husby, Michael P., et al., "The Association between the PR Interval and Left Ventricular Measurements in the Multiethnic Study of Atherosclerosis", Cardiology Res. Practice, vol. 2015, Article ID 193698, 2015, 1-8.

Ieong, Chio-In, et al., "A 0.83-µW QRS detection processor using quadratic spline wavelet transform for wireless ECG acquisition in 0.35-µm CMOS", IEEE Trans. Biomed. Circuits Syst., vol. 6, No. 6, 2012, 586-595.

Kadambe, Shubha, et al., "Wavelet transformbased QRS complex detector", IEEE Trans. Biomed. Eng., vol. 46, No. 7, 1999, 838-848.

Khayatzadeh, Mahmood, et al., "A 0.7-V 17.4-u 3-Lead Wireless ECG SoC", IEEE Trans. Biomed. Circuits Syst., vol. 7, No. 5, 2013, 583-592.

Kim, Hyejung, et al., "Motion Artifact Removal using Cascade Adaptive Filtering for Ambulatory ECG Monitoring System", Proc. Biomed. Circuits Syst. Conf., 2012, 160-163.

Kobayashi, Takashi, et al., "Abstract 13451: Prolonged PR interval is significantly associated with increased risk of cardiovascular diseases and strokes in a population-based cohort study", Circulation, vol. 130, Suppl 2, 2014, A13451.

Krahn, Andrew D., et al., "Hysteresis of the RT interval with exercise", Circulation, vol. 96, No. 5, 1997, 1551-1556.

Laguna, P., et al., "A database for evaluation of algorithms for measurement of QT and other waveform intervals in the ECG", Proc. Comput. Cardiology, 1997, 673-676.

Laguna, Pablo, et al., "Automatic Detection of Wave Boundaries in Multilead ECG Signals: Validation With the CSE Database", Comput. Biomed. Res., vol. 27, No. 1, 1994, 45-60.

Li, Pengfei, et al., "High-Performance Personalized Heartbeat Classification Model for Long-Term ECG Signal", IEEE Transactions on Biomedical Engineering, vol. 64, No. 1, 2017, 78-86.

Lin, Chao, et al., "P- and T-Wave Delineation in ECG Signals Using a Bayesian Approach and a Partially Collapsed Gibbs Sampler", IEEE Trans. Biomed. Eng., vol. 57, No. 12, 2010, 2840-2849.

Liseth, Olav E., et al., "Power-efficient cross-correlation beat detection in electrocardiogram analysis using bitstreams", IEEE Trans. Biomed. Circuits Syst., vol. 4, No. 6, 2010, 419-425.

Liu, Xin, et al., "A 457 nW Near-Threshold Cognitive Multi-Functional ECG Processor for Long-Term Cardiac Monitoring", IEEE Journal of Solid-State Circuits, vol. 49, No. 11, 2014, 2422-2434.

Martinez, Juan Pablo, et al., "A Wavelet-Based ECG Delineator: Evaluation on Standard Databases", IEEE Trans. Biomed. Eng., vol. 51, No. 4, 2004, 570-581.

Moody, George B., et al., "The Impact of the MIT-BIH Arrhythmia Database", IEEE Eng. Med. Biol. Mag., vol. 20, No. 3, 2001, 45-50.

Morita, Hiroshi, et al., "The QT syndromes: long and short", Lancet, vol. 372, No. 9640, 2008, 750-763.

Nallathambi, Gabriel, et al., "Integrate and Fire Pulse Train Automaton for QRS detection", IEEE Trans. Biomed. Eng., vol. 61, No. 2, 2014, 317-326.

Pipberger, Hubert V., et al., "The P wave, PR interval, and QT ratio of the normal orthogonal electrocardiogram", Circulation, vol. 18, No. 6, 1958, 1175-1180.

Porta, A., et al., "Performance assessment of standard algorithms for dynamic RT interval measurement: Comparison between RT apex and RT end approach", Med. Biol. Eng. Comput., vol. 36, No. 1, 1998, 35-42.

Qian, Chengliang, et al., "A Low-Power Configurable Neural Recording System for Epileptic Seizure Detection", IEEE Trans. Biomed. Circuits Syst., vol. 7, No. 4, 2013, 499-512.

Ravanshad, Nassim, et al., "An event-based ECGmonitoring and QRS-detection system based on level-crossing sampling", Proc. 2017 Iranian Conf. Electr. Eng., 2017, 302-307.

Rincon, Francisco, et al., "Development and Evaluation of Multilead Wavelet-Based ECG Delineation Algorithms for Embedded Wireless Sensor Nodes", IEEE Trans. Inf. Technol. Biomed., vol. 15, No. 6, 2011, 854-863.

Roh, Hyungdong, et al., "A 0.6-V Delta-Sigma Modulator With Subthreshold-Leakage Suppression Switches", IEEE Trans. Circuits Syst. II, Exp. Briefs, vol. 56, No. 11, 2009, 825-829.

Roh, Jeongjin, et al., "A 0.9-V 60-uW 1-bit fourth-order delta-sigma modulator with 83-dB dynamic range", IEEE J. Solid-State Circuits, vol. 43, No. 2, 2008, 361-370.

Roten, Laurent, et al., "Is 7-day event triggered ECG recording equivalent to 7-day Holter ECG recording for atrial fibrillation screening?", Heart, vol. 98, 2012, 645-649.

Sai, Vyasa, et al., "Exploring Energy Efficient Architectures in Passive Wireless Nodes for IoT Applications", IEEE Circuits and Systems Magazine, vol. 14, Vo. 2, 2014, 48-54.

Sayadi, Omid, et al., "Model-Based ECG Fiducial Points Extraction Using a Modified Extended Kalman Filter Structure", Proc. First Int. Symp. Appl. Sci. Biomed. Commun. Technol., 2008, 1-5.

Speranza, G., et al., "Beat-to-beat measurement and analysis of the RT interval in 24 h ECG Holter recordings", Med. Biol. Eng. Comput., vol. 31, No. 5, 1993, 487-494.

Strumillo, P., "Nested median filtering for detecting T-wave offset in ECGs", Electronics Letters, vol. 38, No. 14, 2002, 682-683.

Sze, Vivienne, et al., "Hardware for Machine Learning: Challenges and Opportunities", arXiv:1612.07625v5, 2017, 1-9.

Tang, X., et al., "A RealTime QRS Detection System With PR/RT Interval and ST Segment Measurements for Wearable ECG Sensors Using Parallel Delta Modulators", IEEE Transactions on Biomedical Circuits and Systems, vol. 12, No. 4, 2018, 751-761.

Tang, Xiaochen, et al., "Analog to Digital Feature Converter based on Oversampling Modulators for ECG Delineation", IEEE 62nd International Midwest Symposium on Circuits and Systems (MWSCAS), 2019, 121-124.

"AD7398/7399 Quad, Serial Input 12-Bit/10Bit DAC's", Analog Devices, Tech. Rep, 2011.

"AD7401 Isolated Sigma-Delta Modulator", Analog Devices, Tech. Rep., 2011.

"ADS131E04 Analog Front-End for Power Monitoring, Control and Protection", Texas Instruments, Tech. Rep, 2013.

"Opal Kelly XEM 3001 User's Manual", Opal Kelly Incorporated, 2004.

Andersson, Mattias, "Continuous-Time Delta-Sigma Modulators for Wireless Communication", Lund Institute of Technology, 2014.

Cherry, James A, et al., "Continuous-Time Delta-Sigma Modulators for High-Speed A/D Conversion", Kluwer Academic Publishers, 2002.

Dias, Victor Da Fonte, "Signal Processing in the Sigma-Delta Domain", Microelectronics Journal, 1995, 543-562.

(56) References Cited

OTHER PUBLICATIONS

Fujisaka, Hisato, et al., "Bit-Stream Signal Processing and its Application to Communication Systems", Circuits, Devices and Systems, 2002, 159-166.

Fujisaka, Hisato, et al., "Sequence Characteristics of Multi-Level and Second-Order Sigma-Delta Modulated Signals", Nonlinear Theory and Its Applications, IEICE, Jul. 1, 2013, 313-339.

Fujisaka, Hisato, et al., "Sorter-Based Arithmetic Circuits for Sigma-Delta Domain Signal Processing—Part II: Multiplication and Algebraic Functions", Transactions on Circuits and Systems I: Regular Papers, IEEE, Sep. 2012, 1966-1979.

Fujisaka, Hisato, et al., "Sorter-Based Arithmetic Circuits for Sigma-Delta Domain Signal Processing—Part I; Addition, Approximate Transcendental Functions, and Log-Domain Operations", Transactions on Circuits and Systems I: Regular Papers, IEEE, Sep. 2012, 1952-1965.

Hafshejani, E. H., et al., "A lowpower signal-dependent sampling technique: Analysis, implementation, and applications", IEEE Transactions on Circuits and Systems I: Regular Papers, vol. 67, No. 12, 2020, 4334-4347.

Hafshejani, E. H., et al., "Self-aware data processing for power saving in resource-contrained iot cyberphysical systems", IEEE Sensors Journal. vol. 22, No. 4, 2021, 3648-3659.

Hidaka, Yuji, et al., "Piecewise Linear Operations on Sigma-Delta Modulated Signals", vol. 3, 2002, 983-986.

Horianopoulos, S., et al., "Design Technique for Hardware Reduction in Delta Modulation FIR Filters", International Journal of Electronics, 1991, 93-106.

Johns, David A, et al., "Design and Analysis of Delta-Sigma Based IIR Filters", IEEE Transactions on Circuits and Systems-II: Analog and Digital Signal Processing, Apr. 1993, 233.

Katao, Tsubasa, et al., "Single-Electron Arithmetic Circuits for Sigma-Delta Domain Signal Processing", Nanotechnology NANO 2008. 8th IEEE Conference on Aug. 2008, 2008, 729-732.

Konstantinides, K., et al., "An architecture for lossy compression of waveforms using piecewise-linear approximation", IEEE Transactions on Signal Processing, Vo. 42, No. 9, 1994, 2449-2454.

Kouvaras, N., et al., "A Technique for a Substantial Reduction of the Quantization Noise in the Direct Processing of Delta-Modulated Signals", Signal Processing, 1985, 107-119.

Kouvaras, N., "Modular network for direct complete addition of delta-modulated signals with minimum quantization error", Int. J. Electronics, 1985, 587-595.

Kouvaras, N., "Operations on Delta-Modulated Signals and Their Application in the Realization of Digital Filters", Radio and Electronic Engineer, Sep. 1978, 431-438.

Kouvaras, N., "Some Novel Elements for Delta-Modulated Signal Processing", Radio and Electronic Engineer, May 1981, 241-250.

Lee, Ho-Yin, et al., "Designing Low Power of Sigma Delta Modulator for Biomedical Application, Biomedical Enginnering Applicatons, Basis & Communications", Biomed, Eng. Appl. Basis Commun., vol. 17, 2005, 181-185.

Li, Y., et al., "A sub-microwatt Asynchronous level-crossing adc for biomedical applications", IEEE Transactions on Biomedical Circuits and Systems, vol. 7, No. 2, 2013, 149-157.

Li, Bingxin, "Design of Multi-bit Sigma-Delta Modulators for Digital Wireless Communications", Kungl Royal Institute of Technology Department of Microelectronics & Information Technology, 2003.

Liang, Y., et al., "Design of High Speed High SNR Bit-Stream Adder Based on Delta-Sigma Modulation", Electronics Letters, May 2010, 752-753.

Liu, Yifei, et al., "Hardware-Efficient Delta Sigma-Based Digital Signal Processing Circuits for the Internet-of-Things", Journal of Low Power Electronics and Applications, vol. 5, 2015, 234-256.

Mafi, H., et al., "Digital calibration of elements mismatch in multirate predictive sar adcs", IEEE Transactions on Circuits and Systems I: Regular Papers, vol. 6, No. 12, 2019, 4571-4581.

Matsuyama, Kazutoshi, et al., "Arithmetic and Piecewise Linear Circuits for Sigma-Delta Domain Multi-Level Signal Processing", International Symposium on Nonlinear Theory and its Applications. (NOLTA 2005), Oct. 2005, 58-61.

Moule, Eric C, et al., "Blue-Noise Sigma-Delta Modulator: Improving Substrate Noise and Nonlinear Amplifier Gain Effects", Dept. of Electrical and Computer Engineering University of Rochester Rochester, NY USA, May 27, 2007.

Ng, Chiu-Wa, et al., "Bit-Stream Adders and Multipliers for Tri-Level Sigma-Delta Modulators", Transactions on Circuits and Systems II: Express Briefs, IEEE, Dec. 2007, 1082-1086.

O'Leary, P., et al., "Bit Stream Adder for Oversampling Coded Data", Joanneum Research, Aug. 6, 1990.

Park, Sangil, "Principles of Sigma-Delta Modulation for Analog-to-Digital Converters", Motorola Digital Signal Processors, 1990.

Pavan, Shanthi, et al., "A Power Optimized Continuous-Time $\Delta\Sigma$ Adc for Audio Applications", IEEE Journal of Solid-State Circuits, Feb. 2008.

Pneumatikakis, A., et al., "Realization of a high-order IIR delta signma filter", Int. J. Electronics, 1995, 1071-1089.

Ravenshad, N., et al., "A level-crossing based qrs-detection algorithm for wearable ecg sensors", IEEE Journal of Biomedical and Health Informatics, vol. 18, No. 1, 2014, 183-192.

Schell, B., et al., "A continuous-time ADC/DSP/DAC System with no Clock and with Activity-Dependent Power Dissipation", IEEE Journal of Solid-State Circuits, vol. 43, No. 11, 2008, 2472-2481.

Schreier, Richard, "Delta Sigma Toolbox", http://www.mathwords.com/matlabcentral/fileexchange/19-delta-sigma toolbox, Dec. 2011.

Tang, X., et al., "A real-time arrhymia heartbeats classification algorithm using parallel delta modulations and rotated linear-kernel support vector machines", IEEE Transactions on Biomedical Engineering, vol. 67, No. 4, 2020, 978-986.

Tang, W., et al., "Continuous Time Level Crossing Sampling ADC for Bio-potential Recording Systems", IEEE Transactions on Circuits and Systems I: Regular Papers, vol. 60, No. 6, 2013, 1407-1418.

Tang, X., et al., "Delta Sigma Encoder for LowPower Wireless Bio-Sensors Using Ultrawideband Impulse Radio", IEEE Transactions on Circuits and Systems II: Express Briefs, vol. 64, No. 7, 2017, 747-751.

Weltin-Wu, C., et al., "An event-driven clockless level-crossing adc with signal dependent adaptive resolution", IEEE Journal of Solid-State Circuits, vol. 48, No. 9, 2013, 2180-2190.

Yoo, Jerald, et al., "An 8-Channel Scalable EEG Acquisition SoC with Fully Integrated Patient-Specific Seizure Classification and Recording Processor", Solid-State Circuits Conference Digest of Technical Papers (ISSCC) IEEE International, Feb. 2012, 292-294.

Yoo, Jerald, et al., "An 8-Channel Scalable EEG Acquisition SoC with Patient-Specific Seizure Classification and Recording Processor", Solid-State Circuits, IEEE Journal, Jan. 2013, 214-228.

Zhang, X., et al., "A 2.89-µ W Dry-Electrode Enabled Clockless Wireless ECG SoC for Wearable Applications", IEEE Journal of Solid-State Circuits, vol. 51, No. 10, 2016, 2287-2298.

Thomas, Julien, et al., "A multi-HMM approach to ECG segmentation", Proc. 18th IEEE Int. Conf. Tools Artif. Intell., 2006, 609-616.

Vila, Jose Antonio, et al., "A New Approach for TU Complex Characterization", IEEE Trans. Biomed. Eng., vol. 47, No. 6, 2000, 764-772.

Wescott, Tim, "Sampling: What Nyquist Didn't Say, and What to Do About It", Wescott Des. Serv., Oregon, OR, USA, Tech. Rep., 2015, 1-27.

Xu, Sean Shensheng, et al., "Towards End-to-End ECG Classification With Raw Signal Extraction and Deep Neural Networks", IEEE journal of biomedical and health informatics, vol. 23, No. 4, 2019, 1574-1584.

Yamaguchi, Masato, et al., "T wave peak-to-end interval and QT dispersion in acquired long QT syndrome: A new index for arrhythmogenicity", Clin. Sci., vol. 105, No. 6, 2003, 671-676.

Yetman, Anji T., et al., "Long-term Outcome and Prognostic Determinants in Children With Hypertrophic Cardiomyopathy", J. Amer. College Cardiology, vol. 32, No. 7, 1998, 1943-1950.

Yin, Shihui, et al., "A 1.06 µw smart ecg processor in 65 nm cmos for real-time biometric authentication and personal cardiac monitoring", 2017 Symposium on VLSI Circuits, 2017, C102-C103.

(56) References Cited

OTHER PUBLICATIONS

Yu, Hang, et al., "A Two-Step Prediction ADC Architecture for Integrated Low Power Image Sensors", IEEE Transactions on Circuits and Systems I: Regular Papers, vol. 64, No. 1, 2017, 50-60.

Zhang, Xiaoyang, et al., "A 300-mV 220-nW Event-Driven ADC With Real-Time QRS Detection forWearable ECG Sensors", IEEE Trans. Biomed. Circuits Syst., vol. 8, No. 6, 2014, 834-843.

\* cited by examiner

| Method | waves | # Annots | Se(%) | P+(%) | $m \pm s$ (ms) |
|---|---|---|---|---|---|
| This work | $P_{peak}$ | 3129 | 91.12 | 92.44 | 14.85 ± 15.07 |
| | $T_{peak}$ | 3475 | 98.36 | 98.99 | 17.01 ± 15.69 |
| DWT [42][a] | $P_{peak}$ | N/A | 99.87 | 92.46 | 10.1 ± 8.9 |
| | $T_{peak}$ | N/A | 99.97 | 98.91 | 3.7 ± 13.0 |
| PCGS [27] | $P_{peak}$ | 3176 | 98.93 | 97.40 | 4.1 ± 8.6 |
| | $T_{peak}$ | 3403 | 99.81 | 98.97 | 1.3 ± 10.5 |
| WT [26] | $P_{peak}$ | 3194 | 98.87 | 91.03 | 3.6 ± 13.2 |
| | $T_{peak}$ | 3542 | 99.77 | 97.79 | 0.2 ± 13.9 |
| LPD [43] | $P_{peak}$ | N/A | 97.70 | 91.17 | 4.8 ± 10.6 |
| | $T_{peak}$ | N/A | 99.00 | 97.74 | −7.2 ± 14.3 |
| TU [44] | $P_{peak}$ | N/A | N/A | N/A | N/A |
| | $T_{peak}$ | N/A | 92.60 | N/A | −12.0 ± 23.4 |

[a] One channel accuracy and time errors.

Fig. 17

| Method | Interval | $m$ (ms) | $s$ (ms) |
|---|---|---|---|
| Online and Offline [45] | PR interval | -1.1 | 10.0 |
| This work | PR interval | 0.18 | 17.47 |
| | RT interval | -2.13 | 17.02 |
| | ST segment | 0.50 | 19.95 |

TABLE I
PERFORMANCE OF THE PROPOSED QRS DETECTORS

Fig. 21

ELECTROCARDIOGRAM SENSING AND PROCESSING

CROSS-REFERENCE TO RELATED APPLICATIONS

This application is a continuation application of U.S. patent application Ser. No. 16/711,266, filed on Dec. 11, 2019, entitled "Method and Apparatus of Electrocardiography Delineation and Arrhythmia Detection Using Delta Modulation", which itself claims priority to and the benefit of the filing of U.S. Provisional Patent Application Ser. No. 62/778,156, entitled "Real-Time QRS Detection System with PR/RT Interval and ST Segment Measurements for Wearable ECG Sensors using Parallel Delta Modulators", filed on Dec. 11, 2018, and the specification and claims, if any, thereof are incorporated herein by reference.

STATEMENT REGARDING FEDERALLY SPONSORED RESEARCH OR DEVELOPMENT

This invention was made with government support under contract number 27508 and grant number 1652944 awarded by the National Science Foundation. The government has certain rights in the invention.

BACKGROUND OF THE INVENTION

Embodiments of the present invention relate to the field of digital signal processing. Particularly, embodiments of the present invention relate to a real-time electrocardiogram ("ECG") monitoring system, having low power consumption, that is useful for wearable devices.

Cardiovascular disease (CVD) accounts for 31% of all deaths worldwide each year and has been recognized as the leading health problem in many countries. Arrhythmia is an important portion of CVD-caused health deterioration that is linked with high death rate. However, death can be prevented by timely diagnosis and treatment. The Holter Monitor is the most widely used device in the clinic to record patients' ECG data for a certain period, usually 24 hours, and store the data in a memory device. Then, a diagnosis is performed by doctors obtaining and analyzing the recorded data. There are several limitations in the Holter system. First, there is no guarantee that there will be episodes of arrhythmic heart beats during monitoring. Second, if there are severe arrhythmic heart beats, the system cannot send the alert signal because it doesn't have on-sensor processing and communication functions. Third, the system is relatively bulky, constrains activity, and is uncomfortable to wear. However, wearable ECG sensors are expected to have signal processing and wireless capabilities to detect arrhythmia and send alert signals.

QRS detection is one of the most important parts of ECG sensor design. The QRS complex represents the electrical impulse as it spreads through the ventricles and indicates ventricular depolarization. Current QRS detection systems can primarily be divided into two categories: The first category is detection systems that need additional computational help, usually via digital signal processors ("DSP"s) or central processing units ("CPU"s), for example wavelet, or artificial neural networks. These computations can obtain very precise detection results, but they are difficult to implement in wearable devices because of the power consumption. The second category of QRS detection includes systems that combine DSP and analog to digital converter ("ADC"). These systems allow processing of data in real time, which can obtain reasonably precise results with low hardware complexity. Examples include on-chip cross-correlation, integrate and fire pulse train automation, pulse-triggered and time-assisted pulse-triggered, and input-feature correlated algorithms. Because the ECG signal has a wide fractional bandwidth in the frequency spectrum, the ADC in these systems usually applies oversampling in order to avoid signal distortion introduced by anti-aliasing filters due to the trade-off between fast roll-off and flat group delay. Also, a biomedical signal acquisition system normally has a specific resolution requirement. Therefore, non-Nyquist ADCs including Sigma-Delta and Delta modulators are widely used in these systems. Thus, the algorithm for wearable ECG sensors should be able to work with bit-streams because decimation filters are power-hungry.

Besides QRS detection, P wave and T wave detections are also important in ECG signal processing. For example, P wave detection and PR interval measurement play important roles in CVD diagnosis. The morphology of the P wave and the PR interval in the time domain indicates whether the heart is triggered normally by the sinoatrial node. The PR interval is significantly associated with the risk level of all CVDs and especially strokes. As for the T wave, it represents the repolarization of the ventricles, which also has significance in diagnosing certain CVDs. For example, abnormal T waves, such as T wave inversion in the precordial leads, is very common in pulmonary embolism ("PE") patients, which represents the best ECG sign correlated to the severity of PE. Moreover, the RT interval can be useful for the diagnosis of the long-QT syndrome. Other studies have found relationships between PR/RT intervals, ST segments, and certain CVDs in long term ECG recordings. However, because P and T waves are commonly less distinguishable in morphology than R waves, they are more difficult to detect. As a result, P and T wave detection algorithms, for example wavelet-based, Bayesian approach, Kalman filters, Nested median filtering, Hidden Markov models, and Gaussian mixture models, involve complicated computation, which makes them difficult to implement in battery powered wearable devices.

Due to latency, security, privacy requirements, and power consumption of data transmission, on-sensor processing in wearable heart monitoring systems is preferred over sending raw data to the cloud. Examples of on-sensor processing include extracting and sending important information to nurses and automatic arrhythmia classification with the help of machine learning algorithms. Both operations need feature extraction through ECG delineation in order to extract the timing information of the fiducial points, such as the onset, peak, and offset of the P, Q, R, S, and T waves. In primary arrhythmia detections, the most useful features are: (1) R-R interval and its variation, (2) P-R interval and its variation, (3) duration of the QRS Complex, and (4) P wave morphology: positive (+), negative (−), biphasic (+/−, −/+). Therefore, identifying the turning points in the ECG waveforms is critical. It is also a very challenging to locate the onset/offset of the waves. Currently, most ECG sensing and processing systems rely on conventional ADC and discrete wavelet transform with zero-crossing, level-crossing ADC, or Delta modulation. These methods are susceptible to baseline wandering because they rely on a stable reference line for the crossing detection algorithms. Though the second-derivative method is robust to baseline wandering, the power consumption of performing complicated digital processing would reduce the battery lifetime. Moreover, the delineation timing errors of these methods are often beyond the standard medical tolerance.

Future wearable wireless biomedical sensors demand novel technologies to overcome the increasing challenge in implementing intelligent signal sensing and processing and inadequate battery lifetime. Such devices are expected to provide automatic monitoring and processing of physiological signals, to identify abnormal signals, and contact medical systems if necessary. The wearable ECG sensor is critical to arrhythmia detection. However, most of the current solutions for ECG monitoring lack local signal processing capabilities on the wearable sensor and instead rely heavily on wireless data communication and remote processing. Wireless communication is power-hungry and brings with it security, privacy and latency issues. Most current solutions operate this way because on-sensor ECG signal analysis is power-hungry due to the high computing overhead of the circuits and systems that perform the digital signal processing, making these solutions unsuitable for implementation with wearable sensors.

Machine learning is a promising solution and has recently been applied to continuous monitoring of physiological signals for on-sensor processing. However, the implementation of deep learning inference using a neural network would consume hundreds of milliwatts ("mW") due to the intensive multiply-and-accumulate ("MAC") operations and the data movement between the memory and the processing unit. The wearable sensors need to keep the power consumption at the level of milliwatts or less in order to keep a reasonable battery lifetime. Therefore, a machine learning algorithm that can accommodate real-time processing without too much data storage and movement is preferred in wearable sensor applications.

One of the most power-hungry parts in machine learning is feature extraction, which requires extracting key features of the input analog signal. The features are most preferably in digital format because most machine learning systems are implemented in digital. To address this issue, one idea is to extract the features during data conversion. However, current Nyquist ADCs are converting data by sampling, which does not have the capability of extracting features. In order to extract features, the samples should be compared with its neighboring samples. Oversampling data conversion meets this requirement. Compared to the conventional ADC, which focuses on preservation of the signal quality in the digital domain so that the reconstruction of the analog signal is accurate, Delta-modulator-based analog to bitstream conversion emphasizes extracting the features from the analog signal during analog to digital conversion, without considering signal reconstruction.

U.S. Pat. No. 4,448,196, describes a system wherein Delta modulators are applied in a heart pacer for measuring the DC operating voltage levels. That reference, however, fails to teach their use for determining the fiducial points. U.S. Pat. No. 4,567,883 teaches the use of Delta modulators for ECG data compression, however, that reference also fails to teach their use for determining fiducial points. U.S. Pat. No. 5,014,284 describes the use of Delta modulators to measure the slope values of ECG signals. That system, however, lacks the ability to delineate fiducial points. U.S. Pat. No. 5,301,677 discloses the application of a single-channel first-order Delta modulator to measure a turning point of the ECG signal for arrhythmia detection. That system, however, only classifies the signal as "no slope", "positive slope", and "negative slope" without locating the key fiducial points. ECG delineation is one step to classify arrhythmias. ECG analysis methods are often based on delineation with the known fiducial points. For example, U.S. Pat. Publication. No. 2014/0148714 describes automatic delineation of the ECG signal based on mathematical processing, which requires complicated computing algorithms and heavy computational overhead, thus requiring significant power and rendering it unfit for a wearable device. U.S. Patent Publication No. 2016/0120431A1 describes an automated ECG feature extraction method that can detect a single fiducial point using a relatively complicated discrete wavelet transform ("DWT") and a curve length transform ("CLT"). That system, however, is unable to detect more than a single fiducial point. None of the abovementioned methods applies ternary first and second-order Delta modulation in detecting the fiducial points of ECG to perform delineation.

BRIEF SUMMARY OF EMBODIMENTS OF THE PRESENT INVENTION

Embodiments of the present invention relate to an electrocardiogram sensing and processing apparatus including a ternary first-order Delta modulator circuit, a ternary second-order Delta modulator circuit, and a digital logic algorithm configured to provide delineation to extract at least a plurality of fiducial points from an electrocardiogram signal during analog to digital conversion comprising Delta modulated bitstreams. The electrocardiogram sensing and processing apparatus can also include a parallel first-order Delta modulator circuit, a parallel second-order Delta modulator circuit, or a mixed parallel first-order and second-order Delta modulator circuit. Optionally, the ternary first-order Delta modulator can be configured to convert the electrocardiogram signal into two digital bitstreams. A first of the two digital can represent a rising slope of the electrocardiogram signal and a second of the two digital bitstreams can represent a falling slope of the electrocardiogram signal. A pulse density of the first bitstream can be proportional to a rising slope of the electrocardiogram signal and a pulse density of the second bitstream can be proportional to a negative slope of the electrocardiogram signal.

In one embodiment, the ternary first-order Delta modulator circuit can include a feedback subtractor and an integrator. The ternary first-order Delta modulator circuit can optionally include a tri-state comparator or two parallel comparators. The ternary first-order Delta modulator circuit can be configured to compare the voltage from the subtractor with two reference voltages and output the first and second bitstreams. The two digital bitstreams can control a feedback voltage switch and the feedback voltage switch can be configured to control a feedback voltage. The feedback voltage can be integrated in an integrator. The feedback subtractor can be configured to subtract an output of the integrator from the electrocardiogram signal.

The ternary second-order Delta modulator can be configured to convert the electrocardiogram signal into two digital bitstreams, a first of the two digital bitstreams represents an up-turning-point in the electrocardiogram signal and a second of the two digital bitstreams can represent a down-turning-point of the electrocardiogram signal. A pulse density of the first bitstream is preferably proportional to a magnitude of an up-turning-rate of the electrocardiogram signal at the up-turning-point and wherein a pulse density of the second bitstream is proportional to a magnitude of a down-turning-rate of the electrocardiogram signal at the down-turning-point.

The ternary second-order Delta modulator circuit can include at least two feedback subtractors and at least two integrators. Optionally, the ternary second-order Delta modulator circuit can include a tri-state comparator or at least two parallel comparators that are configured to compare a voltage from at least one of the at least two feedback subtractors with at least two reference voltages to generate the two digital bitstreams. The two digital bitstreams preferably control feedback voltage switches and the feedback voltage switches are configured to control a feedback voltage. The at least two integrators can include at least two feedback voltage switches and an output of a first of the at least two integrators is preferably subtracted from the electrocardiogram signal in a first of the at least two feedback subtractors. An output of a second of the at least two integrators is preferably subtracted from an output of a first of the at least two feedback subtractors in a second of the at least two feedback subtractors. Optionally, a feedback voltage switch can be configured to be controlled by the two digital bitstreams and the feedback voltage switch can be configured to control a feedback voltage and an integrator can be configured to integrate the feedback voltage. The electrocardiogram sensing and processing apparatus is preferably configured to extract at least two fiducial points that can include the onset, peak, and end points of any one or more of the P, Q, R, S, and T waves of the electrocardiogram signal.

Embodiments of the present invention can use parallel first-order Delta modulators or parallel second-order Delta modulators, or mixed parallel first and second-order Delta modulators.

Parallel Delta modulators are preferably used. The individual Delta modulators can be either first-order or second-order Delta modulators, running in parallel. The difference in these Delta modulators running in parallel can optionally include (1) different reference voltages, (2) different integration gains, or (3) sensing electrocardiogram signals with different analog amplitudes due to the different gains in the pre-amplifiers.

The Delta modulators can optionally be optimized for delineation of high amplitude and/or fast waves, including but not limited to the QRS complex. Optionally, the Delta modulators can be optimized for delineation of low amplitude and/or slow waves, including but not limited to P waves and T waves.

In one embodiment, the present invention can include digital logic algorithms configured to process the bitstreams from the parallel Delta modulators. The digital logic can include data cache, peak and turning point searching, communication from QRS to PT channels, P wave morphology analyzing, and noise removing logic. The data cache preferably stores an episode of the bitstreams from each individual Delta modulator. The first step can include removing noise bits using standard dilation and erosion algorithms. Then, the peak and turning point search algorithm preferably searches the fiducial points of the QRS complex from the data cache of the Delta modulator that is preferably optimized for QRS detection. After localizing the QRS complex, the peak and turning point searching algorithm preferably searches the fiducial points of the P waves and T waves from the data cache of the Delta modulator that is preferably optimized for P and T waves. This is most preferably done with help from the known location of the QRS complex obtained from the previous step via the communication link from the QRS to PT channel. After localizing the P wave, the P wave morphology analysis algorithm preferably analyzes the morphology of the P wave. Protection window methods are also preferably used to remove noise bits and to avoid false detection. The outputs of the digital logic algorithm are preferably the fiducial points and the P wave morphology.

Embodiments of the present invention relate to a real-time electrocardiogram ("ECG") monitoring and arrhythmia detection system, particularly one that draws low power and is thus especially useful for wearable devices. The system is preferably based on the output bitstream from oversampling modulations. This can preferably include first-order Delta modulators or second-order Delta modulators. Embodiments of the present invention also provide a delineation algorithm to detect the fiducial points of the ECG signal. The delineation algorithm is able to run in real time on the integrated sensor device. Based on the delineation result, arrhythmia detection algorithms are able to classify arrhythmias and generate alert signals to the patient or the doctor.

Embodiments of the present invention preferably include a systematic method of processing electrocardiograph signals using oversampling analog to digital converters, which includes (1) Delta Modulation for ECG pre-processing, and (2) ECG Delineation using Delta Modulated pulse streams.

In particular, this embodiments of the present invention preferably include a Delta modulated method to convert the ECG signal into a series of digital bitstreams using pulse density modulation. The pulse density of the digital pulses (bitstreams) is proportional to the amplitude variation (slope) of the ECG in the first-order Delta modulation. The pulse density of the digital pulses is proportional to the slope variation of the ECG signal in the second-order Delta modulation. Based on pulse density, the slope and the turning point are measured in order to perform delineation.

Embodiments of the present invention preferably perform ECG delineation based on the Delta modulated bitstreams. The ECG delineation preferably identifies the locations of the onset, peak, and endpoints of the P, Q, R, S, and T waves of the ECG signal. These points are also called fiducial points. Since the pulse density of the Delta modulators provides the slope and turning point information, the delineation is performed by identifying the location and sequence of the fiducial points. Parallel Delta modulators can be applied with different thresholds and gain, so that the high amplitude QRS complex and the low amplitude P/T waves can be detected separately to balance the trade-off between sensitivity and overload. The parallel Delta modulators communicate with each other to localize the fiducial points.

Embodiments of the present invention can be used in arrhythmia classification. An arrhythmia classification algorithm can use the location of the fiducial points and the pulse density modulation from the Delta modulators to detect arrhythmias. The proposed system applies in low power wearable ECG monitoring sensors with real-time on-site signal processing applications.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. In the drawings:

FIG. 17 is a table that illustrates simulation results of P and T wave detection for records in the QT database according to an embodiment of the present invention;

FIG. 18 is a table which illustrates performance of PR, RT interval and ST segment detections according to an embodiment of the present invention;

FIG. 20 is a table that illustrates a comparison of low-power QRS detectors and P and T wave detectors and a detector of an embodiment of the present invention; and FIG. 21 is a table which illustrates performance of QRS detectors and a detector of an embodiment of the present invention.

DETAILED DESCRIPTION OF THE INVENTION

Figure 1:
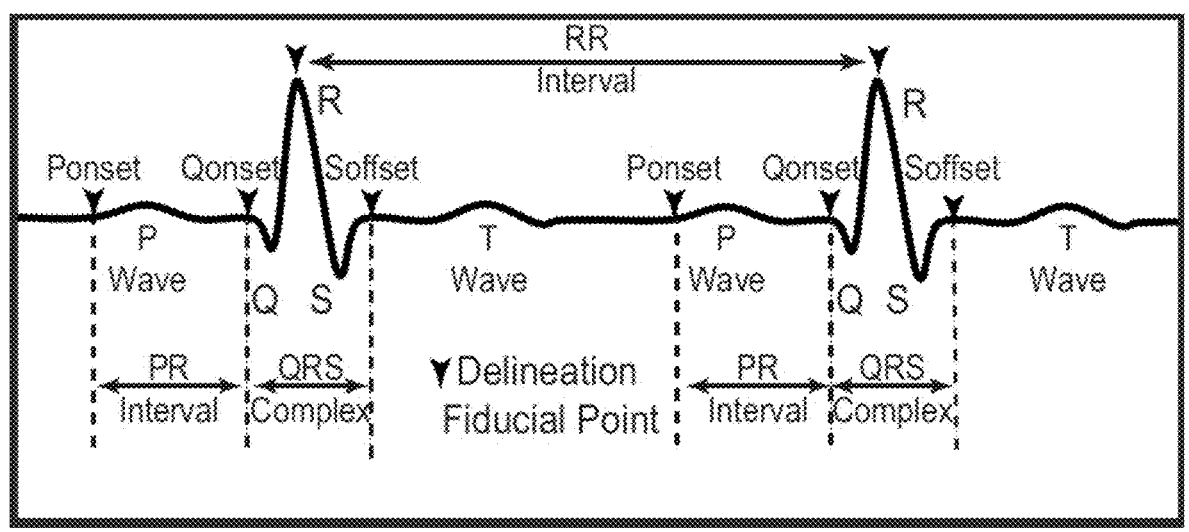
FIG. 1 is a drawing which illustrates an example of an ECG waveform delineation highlighting the fiducial points and intervals according to an embodiment of the present invention.

Embodiments of the present invention relate to a system for QRS detection and P and T wave detection using parallel Delta modulators. The Delta modulation-based ECG monitoring system preferably includes two parts. The first part is the ternary first and second-order Delta modulators that derive Delta modulated bitstreams from analog signals. The second part is the ECG delineation circuits and methods that interpret the resulting Delta modulated bitstreams. The Local Maximum Point (LMaP) and Local Minimum Point (LMiP) algorithms are preferably provided, which can process bit streams from the Delta modulators to identify QRS and PT waves, as well as measure PR/RT intervals and ST segments. ECG delineation detects the timing information of the peak, onset, and end points of different ECG waves, including P, Q, R, S, and T waves, in order to measure the intervals and segments between these waves (see for example FIG. 1). During delineation, the detection of the QRS complex is one of the most important tasks because the QRS complex indicates the contraction process of the ventricles. Besides the QRS complex, the P wave and T wave detection also play very important roles in extracting the features. This is because the P wave indicates that if the heartbeat is initiated by the sinus node while the end of the T wave shows the repolarization of the ventricles. Moreover, the PR/RT/QT intervals and the ST segment are helpful with diagnosing some arrhythmia.

Embodiments of the present invention were verified using 48 modified limb lead II ("MLII") ECG records from the MIT-BIH Arrhythmia Database. The P and T wave detection algorithms were verified by 103 MLII or modified chest lead V5 records from the QT Database. The accuracy of embodiments of the present invention in QRS, P wave, and T wave detection was found to achieve above 99%, 91%, and 98%, respectively, in both sensitivity and positive prediction. A parallel Delta modulator of an embodiment of the present invention was fabricated in IBM 0.13 µm CMOS technology with 720 nW power consumption at a 1 kHz sampling rate. The algorithm was implemented in a Xil- inx Spartan-6 FPGA. The measurement result of the prototype system illustrates that embodiments of the present invention provide desirable results in the field of wearable ECG sensors.

System Architecture

Figure 2A:
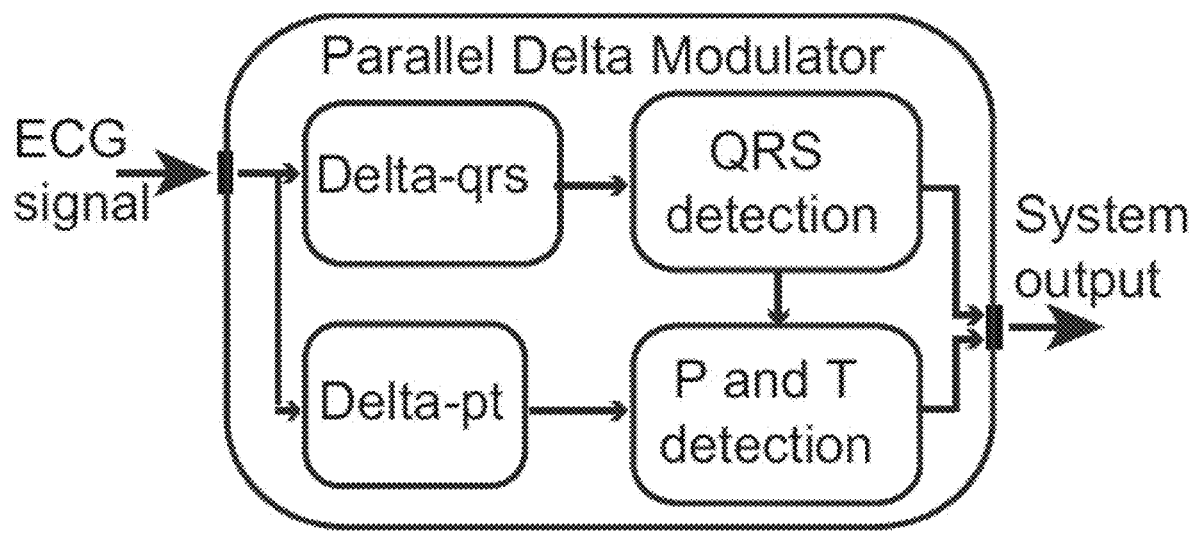
FIG. 2A is a system block diagram of an ECG monitoring system that uses parallel Delta modulators according to an embodiment of the present invention.

A parallel Delta modulator system according to an embodiment of the present invention is illustrated in FIG. 2A, As illustrated therein, two first-order three-state (sometimes referred to as ternary) Delta modulators (Delta-qrs and Delta-pt) are followed by digital circuits that implement QRS and PT detection algorithms used to detect QRS and PT waves separately. In this embodiment, the PT detection circuit uses the information of the detected R peak from the QRS detection circuit in order to locate P and T waves and measure PR/RT intervals and ST segments.

Figure 2B:
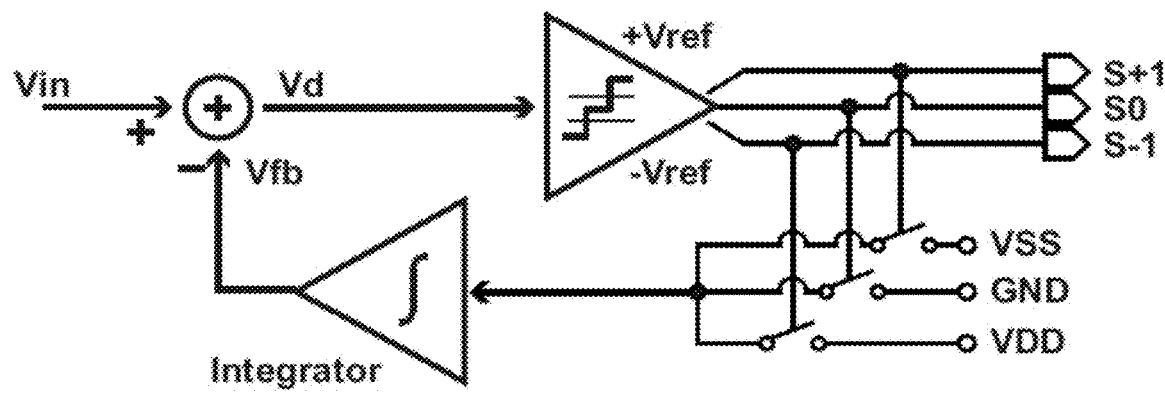
FIG. 2B is a schematic diagram of a system block of a first-order ternary Delta modulator according to an embodiment of the present invention.
Figure 3:
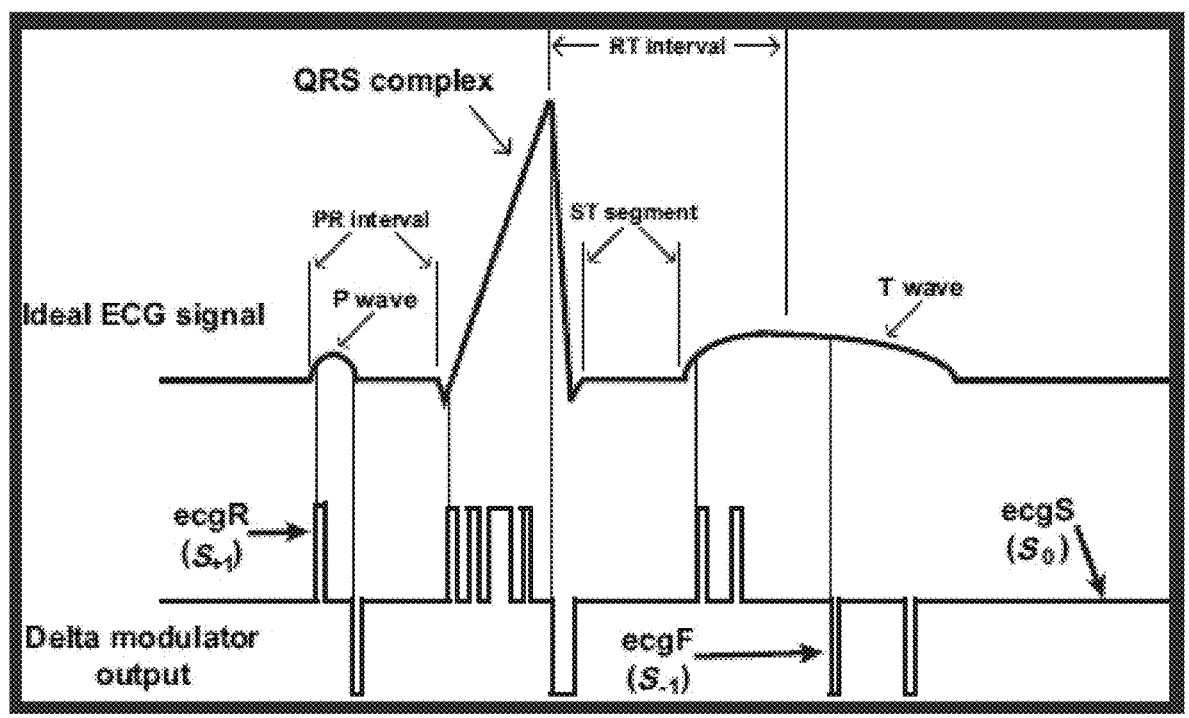
FIG. 3 is a drawing which illustrates an example of a three-state delta modulated ECG waveform according to an embodiment of the present invention.

Delta-qrs and Delta-pt share the same circuit structure of a three-state Delta modulator, as illustrated in FIG. 2B. In the Delta modulator circuit, the input ECG signal $V_{in}$ preferably subtracts the integrated feedback voltage $V_{fb}$ to generate the Delta voltage $V_d$. Then, $V_d$ is compared with the trigger reference voltages $+V_{ref}$ and $-V_{ref}$. The comparison has three potential results, i.e. three states: $S_{+1}$, $S_0$, and $S_{-1}$. Here $S_{+1}$ means $V_d$ is higher than $+V_{ref}$, which indicates the input signal is rising, which is labeled as ecgR. Similarly, $S_{-1}$ means $V_d$ is lower than $-V_{ref}$, which means the input signal is falling, which is labeled as ecgF. So means $V_d$ is between the window formed by $+V_{ref}$ and $-V_{ref}$, which is labeled as ecgS. In one embodiment, the output of the Delta modulator is a three-state bitstream representing the slope information of the input signal. A denser ecgR means the input signal is rising with a higher slope, and vice versa. A long period of time of ecgS means the input signal stays in the range of $\pm V$ref and $-V_{ref}$. Examples of Delta modulator output with ECG signal inputs is illustrated in FIG. 3.

In one embodiment, the outputs of the parallel Delta modulators are two Delta modulated bitstreams from both Delta-qrs and Delta-pt, which are then processed in real time using the LMaP and LMiP algorithms of an embodiment of the present invention to detect QRS and PT waves.

Figure 2C:
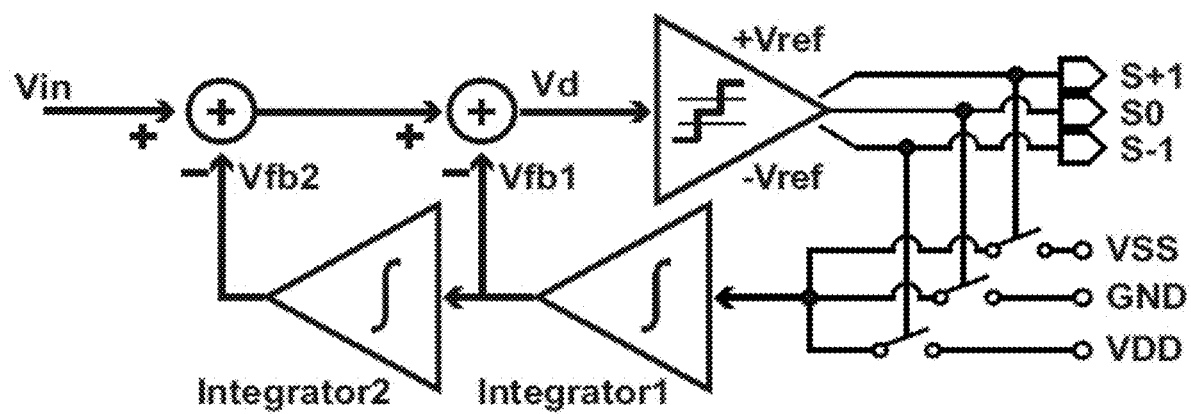
FIG. 2C is a schematic diagram of a system block of a second-order ternary Delta modulator according to an embodiment of the present invention.

The second-order Delta modulator is preferably similar to the first-order Delta modulator, while the residue voltage $V_d$ is now generated by V in subtracting the sum of the outputs from both the integrators. A ternary second-order Delta modulator preferably performs a pulse density modulation in which the pulse density is proportional to the input slope variation. FIG. 2C illustrates the second-order Delta modulator circuit. A ternary quantizer is applied so that no output pulse from $S_{+1}$ and $S_{-1}$ is triggered when the input signal has a constant slope. Two integrators are preferably applied in the feedback loop. Non-overlapping clocks are preferably used to control the switching phases of sampling, integration and comparison. The positive or negative output pulses of the ternary comparator are preferably generated only when the slope of input signal has an up or down variation. Regardless of the initial input slope, an upward-turning point ("UTP") of the analog input preferably results in positive output pulses ($S_{+1}$) while a downward-turning point ("DTP") preferably results in negative output pulses ($S_{-1}$).

Figure 5A:
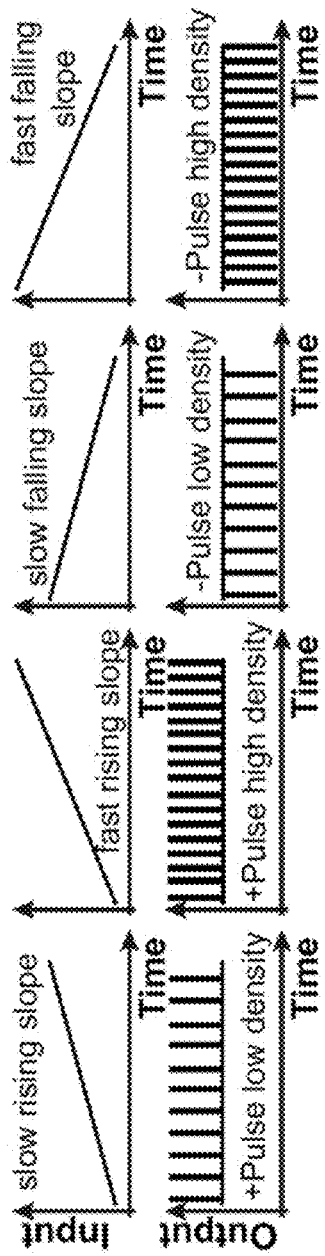
FIG. 5A is a series of graphs which correspond to a first-order Delta modulator with ramp input signals.
Figure 5B:
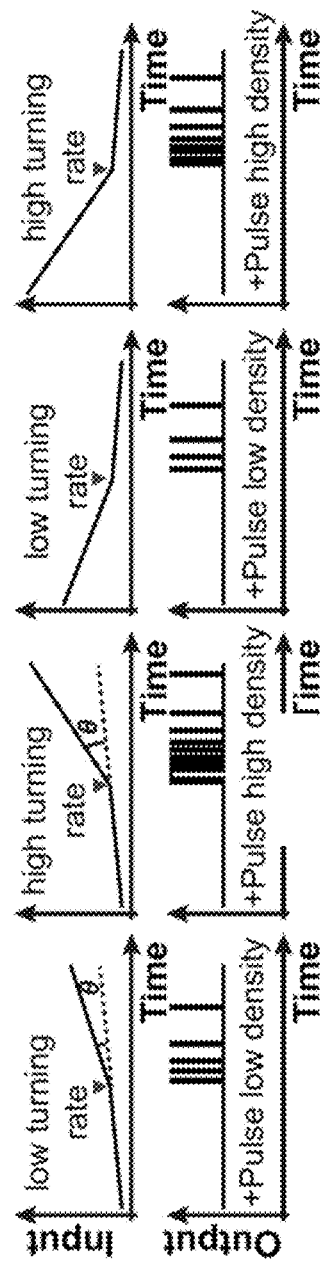
FIG. 5B is a series of graphs which correspond to a second-order Delta modulator with inputs of up-turning points.
Figure 5C:
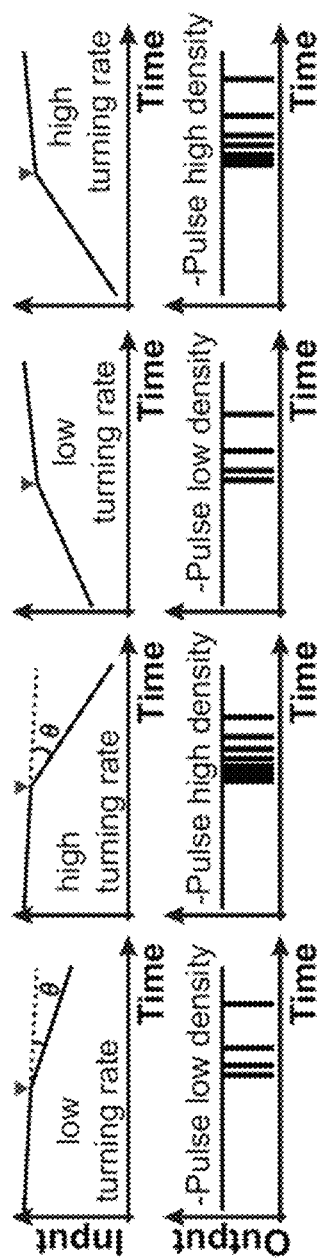
FIG. 5C illustrates graphs corresponding to a second-order Delta modulator with inputs of down-turning points.

A simulation of exemplary behavior of the ternary first-order Delta modulator and the second-order Delta modulator is illustrated in FIGS. 5A-5C. In this embodiment, the first-order Delta modulator preferably detects the slope of the input waveform. If the input has a rising slope, the output preferably generates a positive bitstream and vice versa. While the second-order Delta modulator detects the turning point of the input waveform, when there is an upward turning point, the output generates a positive bitstream where the first positive bit represents the moment of the turning point. Thus, the second-order Delta modulator can be used to detect the onset, peak and end point of the input waveform. FIG. 5A illustrates the first-order Delta modulator's outputs for ramp signals with different slopes. A larger slope in the input signal generates a higher density in the output pulses and vice versa. FIGS. 5B and C illustrates the second-order Delta modulator's output signals with different upward and downward turning angles of the input waveform. A larger upward or downward turning angle (θ) produce a higher pulse density at the positive or negative output, respectively.

Embodiments of the present invention provide delineation using a first-order Delta modulator, for example as illustrated in FIG. 2A. In one embodiment, two first-order three-state Delta modulators (Delta-qrs and Delta-pt), with the following digital circuits implementing QRS and PT detection algorithms, are preferably used to detect QRS and PT waves separately. In the system, the PT detection circuit preferably uses the information of the detected R peak from the QRS detection circuit in order to locate P and T waves and measure PR/RT intervals and ST segments. Because QRS complex has a much higher amplitude and slope compared to P and T waves, the Delta modulators Delta-qrs and Delta-pt preferably have different trigger reference voltages and integration gains. A higher integration gain in Delta-qrs avoids an overload problem of the Delta modulator so the R peak can be accurately detected without time domain distortion. Also, a higher trigger reference voltage can help Delta-qrs to only detect the R wave and ignore low amplitude variations of the ECG signal, which includes P, T, and U waves, DC offsets, and other noises. However, this causes Delta-qrs to ignore the low amplitude waves, such as P and T waves. Meanwhile, Delta-pt is preferably optimized for P and T waves with lower integration gain and trigger reference voltage. However, due to overloading, Delta-pt experiences saturation when R peak arrives, which introduces time domain inaccuracy in R wave detection. Therefore, in order to optimize the integration gain and reference voltages in both the Delta modulators, parameter analysis is preferably applied during circuit design. The parallel Delta modulators can also be implemented using the Delta modulators with the same parameter, but preferably with different analog gain in the previous amplifiers. In choosing the optimized parameters, it is desirable to (1) to avoid saturation in the Delta modulators, (2) to have Delta-qrs only response to QRS complex, and (3) have a clear Delta-pt response to P waves and T waves. As Delta modulators have a low power consumption, the parallel Delta modulators do not require much additional power compared to the single Delta modulator structure. The outputs of the parallel Delta modulators are two Delta modulated bitstreams from both Delta-qrs and Delta-pt, which is then processed in real time to find maximum and minimum points of the waveforms, in order to detect the QRS and PT waves.

Figure 6:
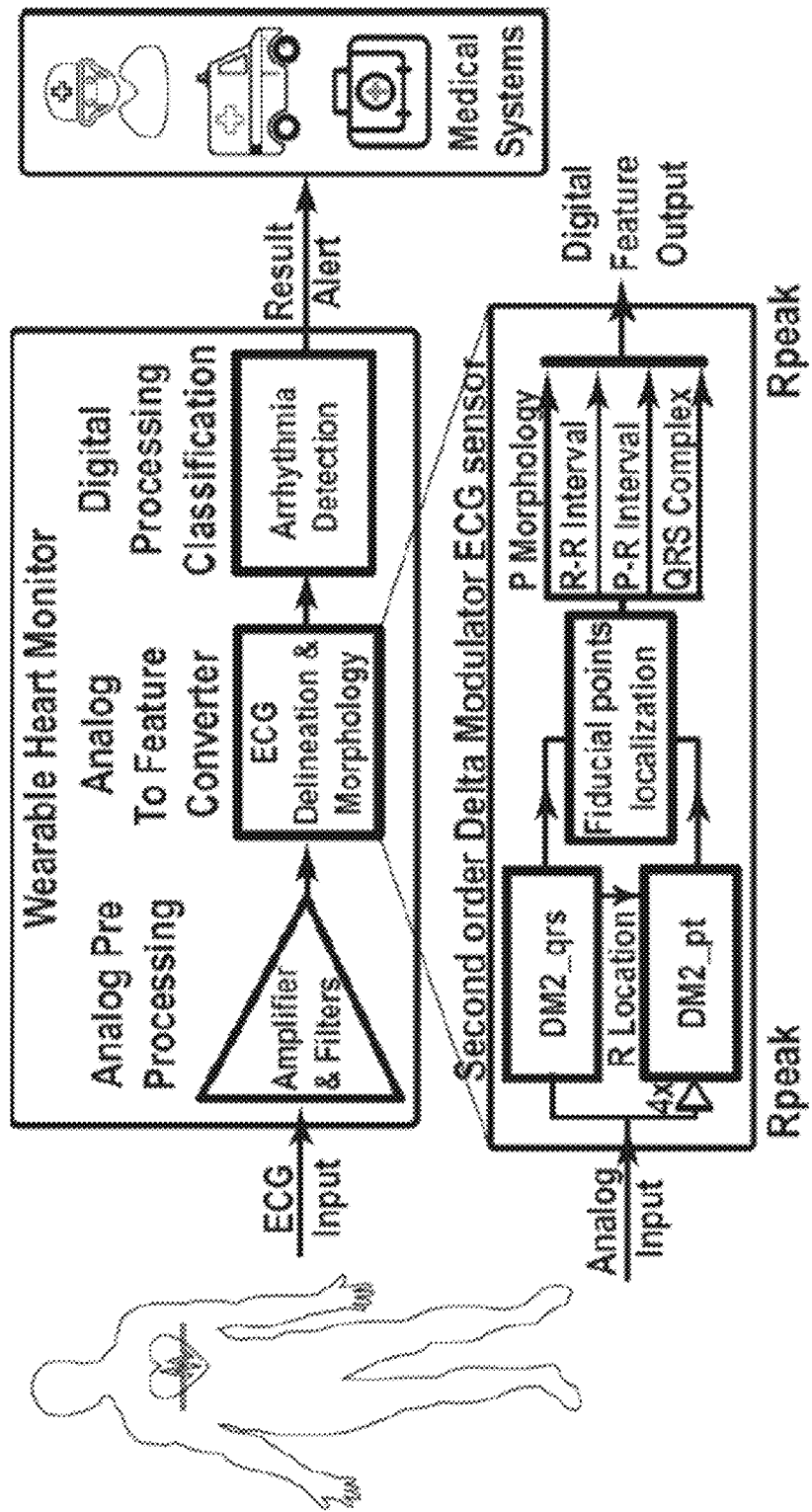
FIG. 6 is a drawing which illustrates a wearable ECG monitor using a parallel second-order Delta modulator for delineation.

Embodiments of the present invention preferably provide delineation using a second-order Delta modulator as illustrated in FIG. 6. To avoid the overloading problem, a parallel structure is preferably applied with two channels of the second-order Delta modulator ("DM2") for ECG delineation. Circuit DM2_pt preferably has an extra amplifier with a gain of about 4 for detecting the P wave and T wave that have lower slope variation than the QRS complex, while circuit DM2_qrs preferably detects the QRS complex. Output pulses of the parallel DM2 are preferably then processed digitally to extract timing information of the fiducial points and the P wave morphology for arrhythmia detection.

Figure 7:
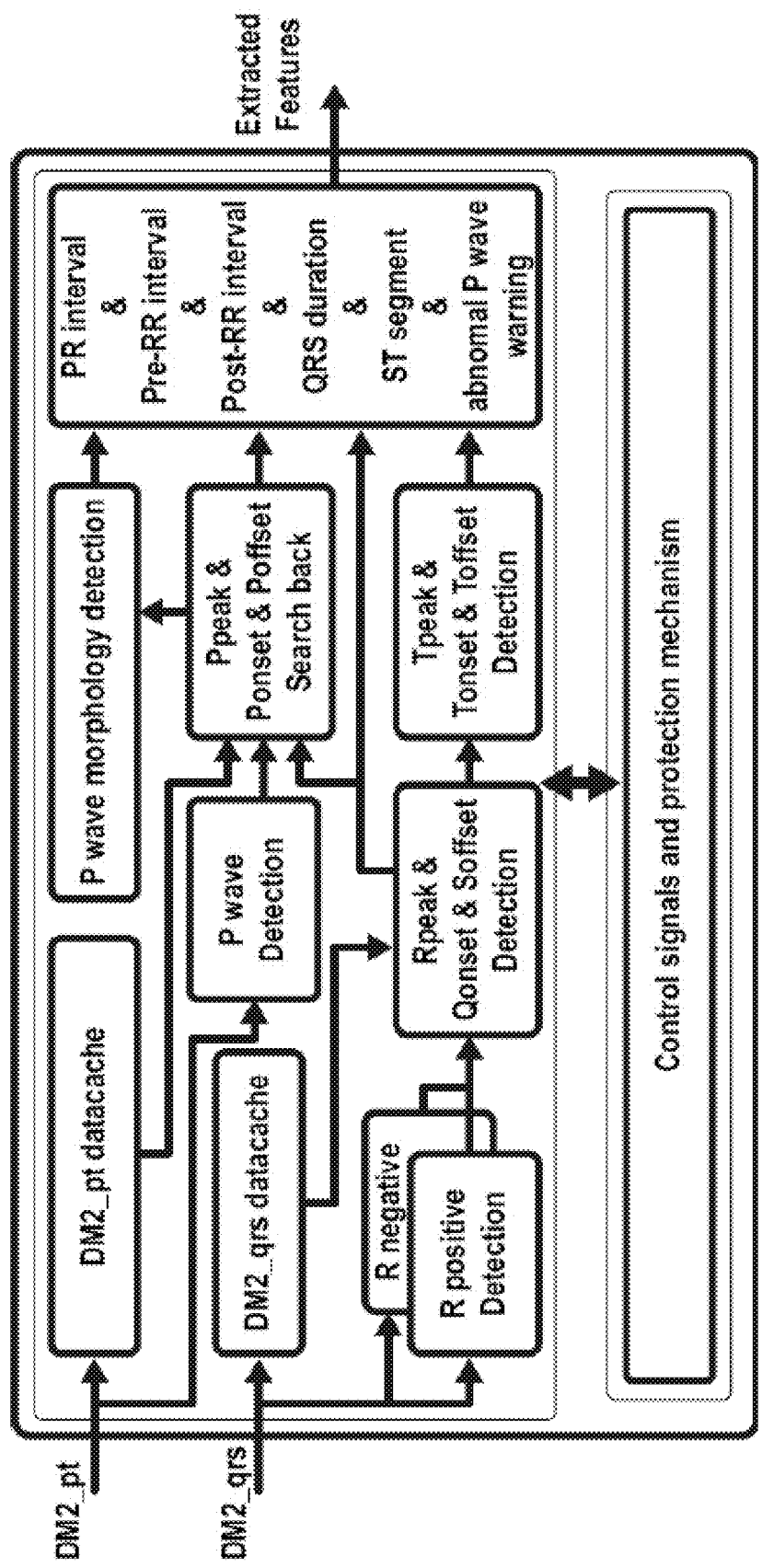
FIG. 7 is a flowchart that depicts an example of a digital fiducial points localization system using the bitstream from the parallel second-order Delta modulators according to an embodiment of the present invention.

Because the QRS complexes are the most distinct marks in ECG signals, in one embodiment, the first step of the algorithm is to find the QRS complex using a predefined threshold of UTP/DTP pulse density in a timing window. As illustrated in FIG. 7, the algorithm is preferably based on detecting the R wave. The detection of a positive/negative R wave is defined as the detection of UTP-DTP-UTP/DTP-UTP-DTP with independent pulse density threshold values from DM2_qrs. Once the R wave is detected, the algorithm searches back to locate the Qonset and Rpeak in a two-channel data-cache that stores past data from DM2_qrs. In one embodiment, the positive Rpeak is preferably located by the first pulse (FP) of the detected DTP pulse cluster and vice versa. An FP is preferably identified if there is no pulse within a predetermined number of prior clock cycles, and a pulse cluster is preferably defined as all pulses in a fixed timing window followed by an FP. Other pulse clusters, before and after Rpeak, are preferably identified from the S-1 of DM2-qrs as the onset and offset of the QRS complex.

Figure 8:
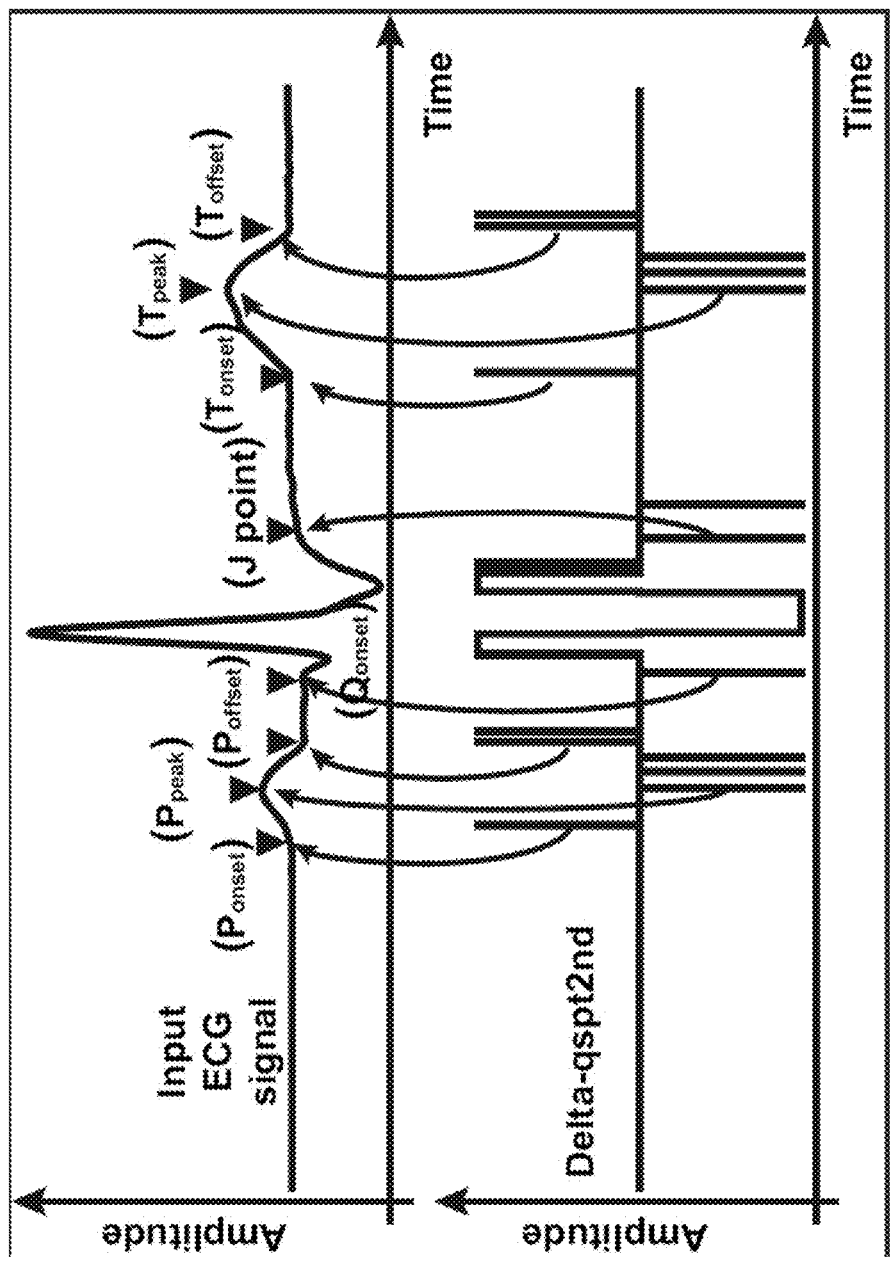
FIG. 8 is a drawing of an example waveform resulting from a second-order Delta modulator, which identifies onset, peak and end points of the P and T waveforms according to an embodiment of the present invention.

The P/T wave detection algorithms preferably use similar strategies. The T wave detection algorithm is preferably not activated until QRS complex is detected. The P wave detection algorithm is preferably parallel with that of R wave. When the first adequate UTP/DTP is identified in positive/negative R wave detection, the P wave detection algorithm is preferably paused. The algorithm preferably resumes once T wave is recognized. Exact timing information of fiducial points of P wave is then extracted from a two-channel data-cache of DM2_pt data. The P wave morphology information is also extracted in this process. Moreover, some protection mechanisms are preferably applied to avoid interference of noise or other disturbances. For example, individual noise pulse in DM2 output can be identified and removed if it is the single pulse in its pulse cluster and located on an unexpected site. Further, constraints are preferably applied for the durations of each wave and the intervals between each pulse cluster. Finally, the timing information of the interval or segment can be calculated. Example waveforms for detecting the fiducial points of the P wave and T wave is illustrated in FIG. 8.

Figure 9:
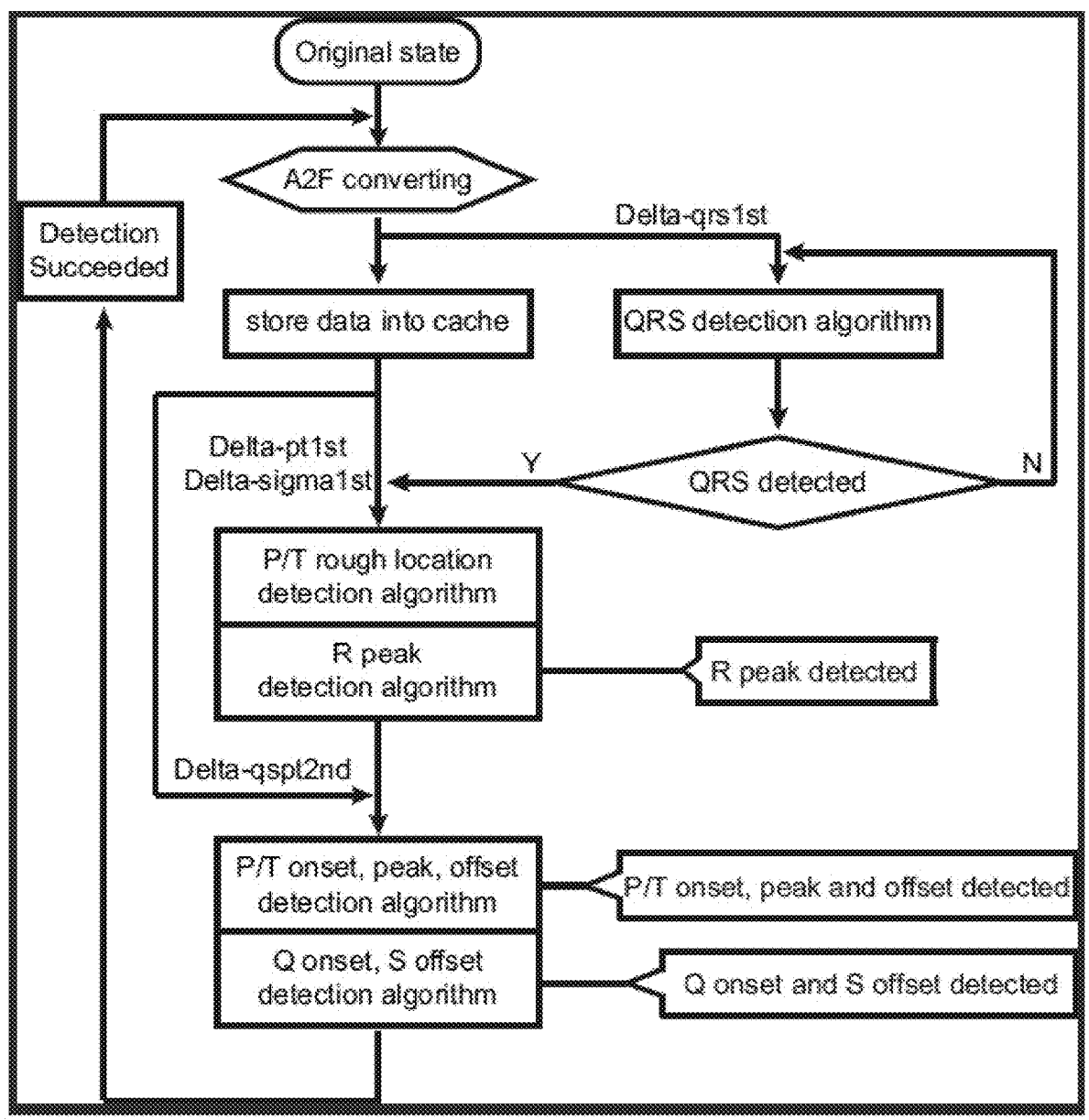
FIG. 9 is a flowchart which illustrates operational flow of a delineation algorithm using both a first and a second Delta modulator according to an embodiment of the present invention.
Figure 10:
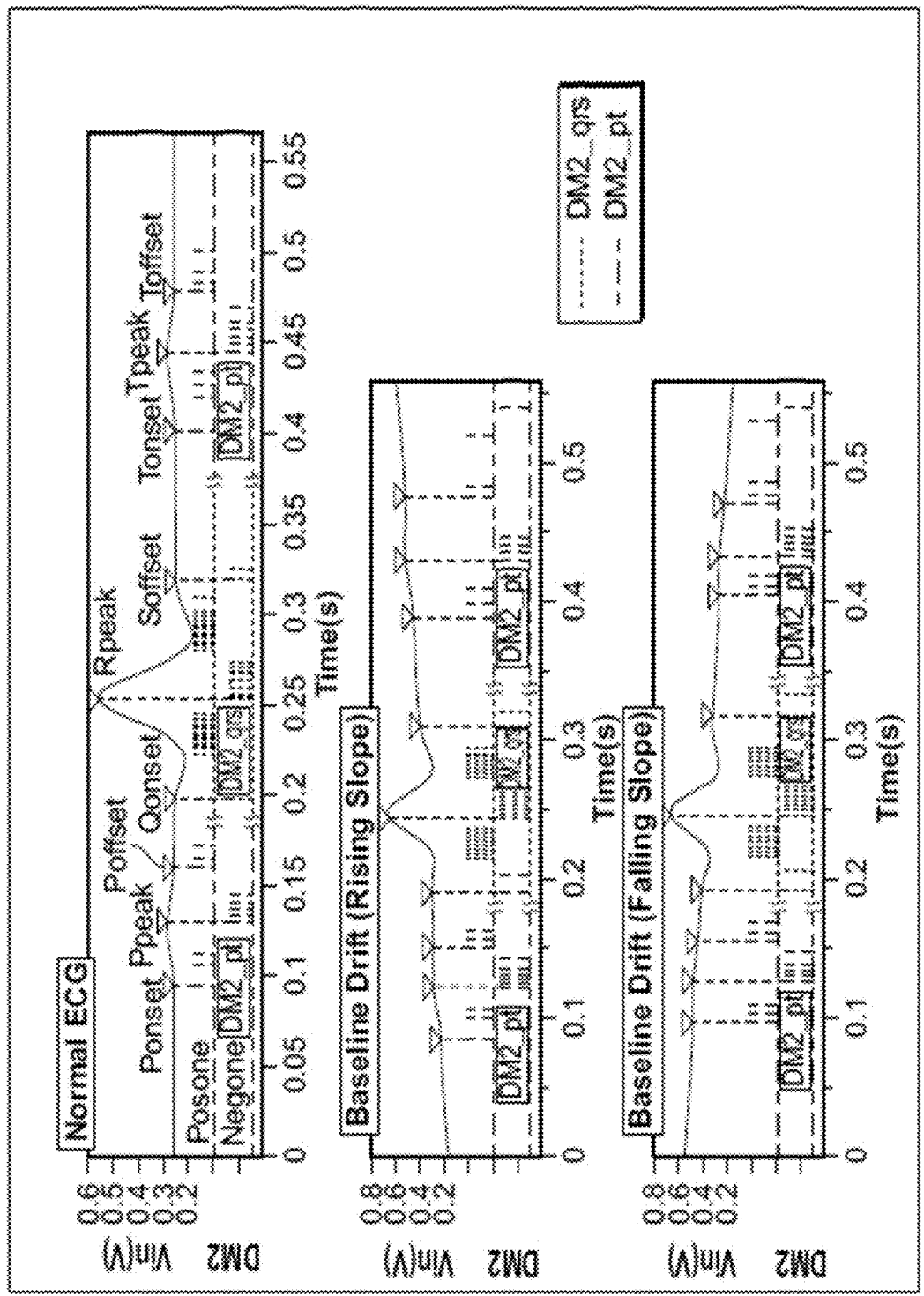
FIG. 10 is a collection of graphs that depict ECG waveform delineation with baseline wandering on the left and categorization of the morphology of P waves on the right according to an embodiment of the present invention.
Figure 10:
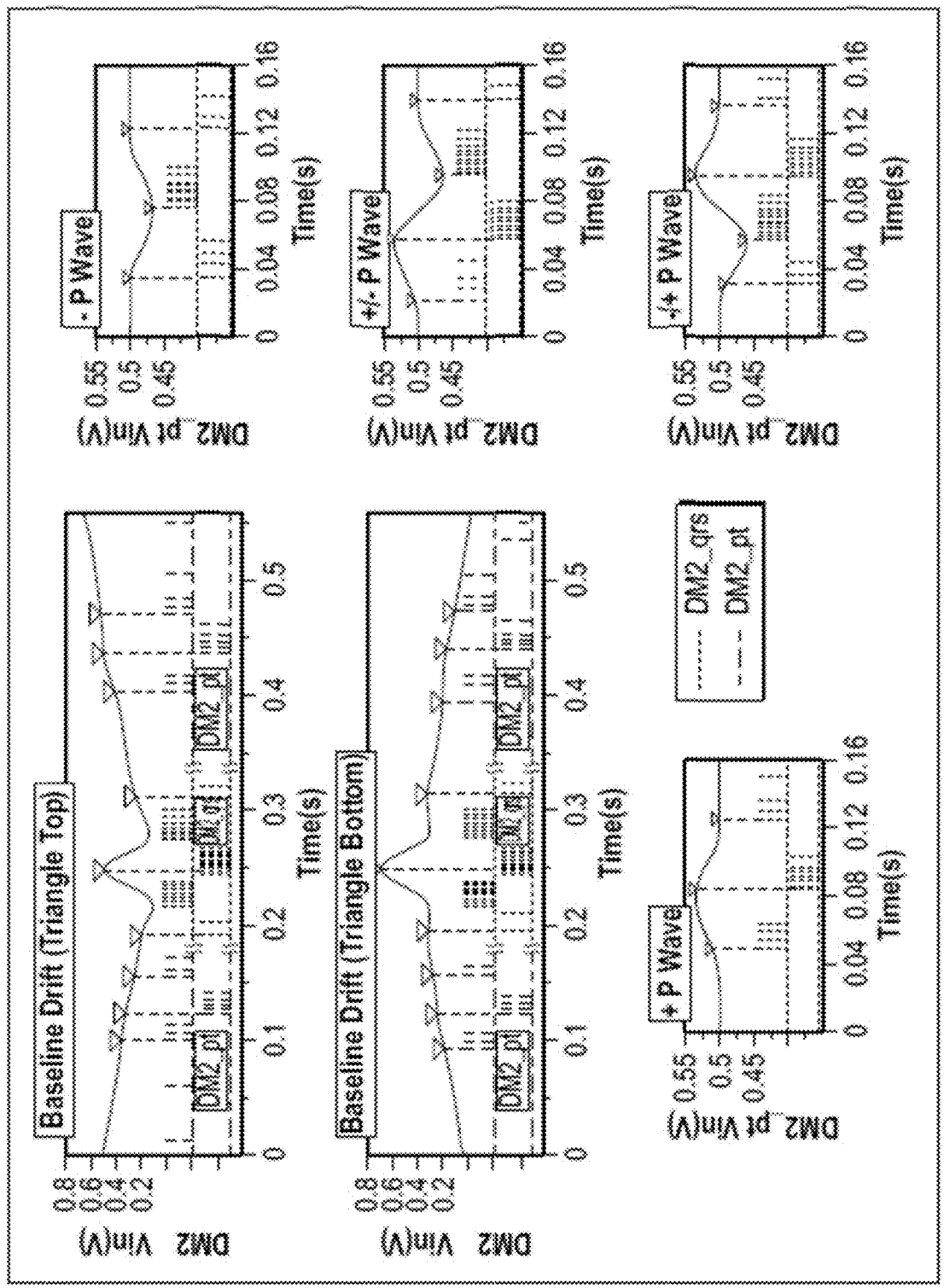

Delineation can also be achieved using both the first and second-order Delta modulator. In one embodiment, parallel first-order and second-order Delta modulators can be used. The second-order Delta Modulator, Delta-qspt2nd, the first-order Delta modulator, Delta-qrs1st, and Delta-pt1st with different integration gains can be provided for detecting the QRS and the P/T waves, respectively. An embodiment of a delineation algorithm according to an embodiment of the present invention is illustrated in FIG. 9. Most preferably, in a first step, the QRS complexes are detected by the Delta modulator, Delta-qrs1st, with the QRS detection algorithm. The objective is to find the waves that meet the defined requirement of the slope. In a second step, the Delta modulator, Delta-pt1st, preferably starts to search back to find the rough P wave location and wait for detecting the T wave location. Meanwhile, a moving average value register preferably records the maximum point in the QRS detection area from the bitstream of the Delta-Sigman modulator, Delta-sigma1st. Then, the onset, peak, and the end point of the P/T wave, as well as the onset of Q wave, and the end point of S wave are preferably detected by the second-order Delta modulator, Delta-qspt2nd, because the second-order Delta modulator is good at detecting the turning point of the input waveform. The parallel Delta modulators can perform delineation with baseline wandering, as is illustrated in the results of ECG delineation and P wave morphology detection in FIG. 10.

Delta Modulator Circuit Design

The design parameters of the Delta modulators preferably include the sampling rate, the bandwidth, the integration gain, the threshold voltages, and the reference voltage. Because the oversampling modulators generate only one bit at a time, the total power consumption is much lower than a conventional multi-bit ADC. Given the fact that biomedical signal acquisition and processing usually require oversampling, the Delta modulators can extract digital features directly from the analog waveform during the analog to digital conversion, which uses less power than the combined power of the conventional ADC and its following digital signal processing circuits.

The Delta modulator circuit preferably performs two jobs in a system according to an embodiment of the present invention. The first job is to convert the analog input of the ECG signal into a digital format for the next processing step. The second job is to work as a feature extractor that illustrates whether the input signal has a positive or negative slope, or stays in a defined range. Delta modulators or Sigma-Delta modulators used as a part of an analog to digital converter ("ADC"), may require a very high oversampling rate ("OSR") to achieve a high signal to noise ratio ("SNR") in order to recover the analog input signal. A high OSR introduces a lot of data which then becomes a heavy burden on the following QRS and PT wave detection circuits. Therefore, in an embodiment of the present invention, because the recovery of the analog input is not the goal, the requirement of OSR can be alleviated in order to save circuit power. While the targeted ECG signal is concentrated in the bandwidth 0.5 Hz-40 Hz, in the Delta modulators of an embodiment of the present invention, the sampling clock is preferably set at a predetermined frequency, most preferably about 1 kHz, and the system input bandwidth is about 0.05 Hz to about 150 Hz for design margins.

Figure 11:
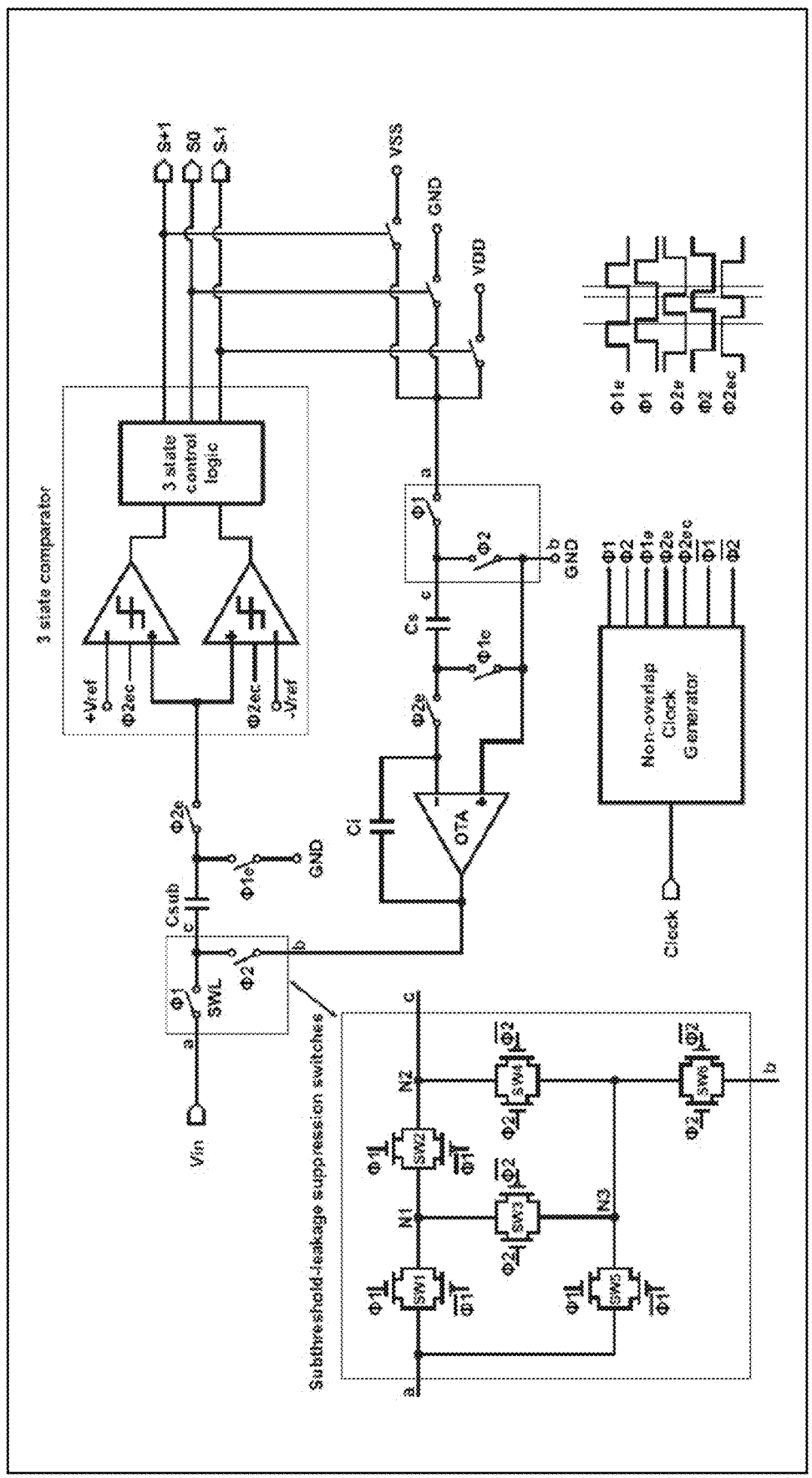
FIG. 11 is a schematic diagram of a Delta modulator according to an embodiment of the present invention.

In one embodiment, a switched-capacitor-based Delta modulator can be used and will provide desirable results. FIG. 11 illustrates a schematic diagram of the switched-capacitor-based Delta modulator of an embodiment of the present invention. The capacitor $C_{sub}$ is the subtraction capacitor that generates $V_d$. Capacitors $C_s$ and $C_i$ are the sampling and integrating capacitors of the feedback integrator, respectively. Non-overlapping clocks control the switch phases φ1 and φ2. The three-state comparator is preferably clocked by φ2ec which has a positive edge a little prior to the negative edge of φ2e. As the Delta modulator works at a relatively low speed, the subthreshold-leakage suppression switches are preferably applied. The leakage current of the switch SWL in FIG. 11 can be expressed in the following relationship:

$$I_{leak} \propto \frac{W}{L} \cdot e^{\frac{v_{GS}-v_{TH}}{m \cdot v_T}} \cdot \left(1 - e^{\frac{-v_{DS}}{v_T}}\right) \quad (1)$$

where m and $v_T$ denote the body effect coefficient and the thermal voltage, respectively. During φ1, SW1, SW2, and SW5 are turned on, which makes node N1, N2 and N3 have the same voltage. During φ2, SW3, SW4, and SW6 are turned on and the rest of the switches are turned off, then $V_{DS}$ of SW2 is reduced to zero to remove the leakage current according to equation (1).

Figure 12:
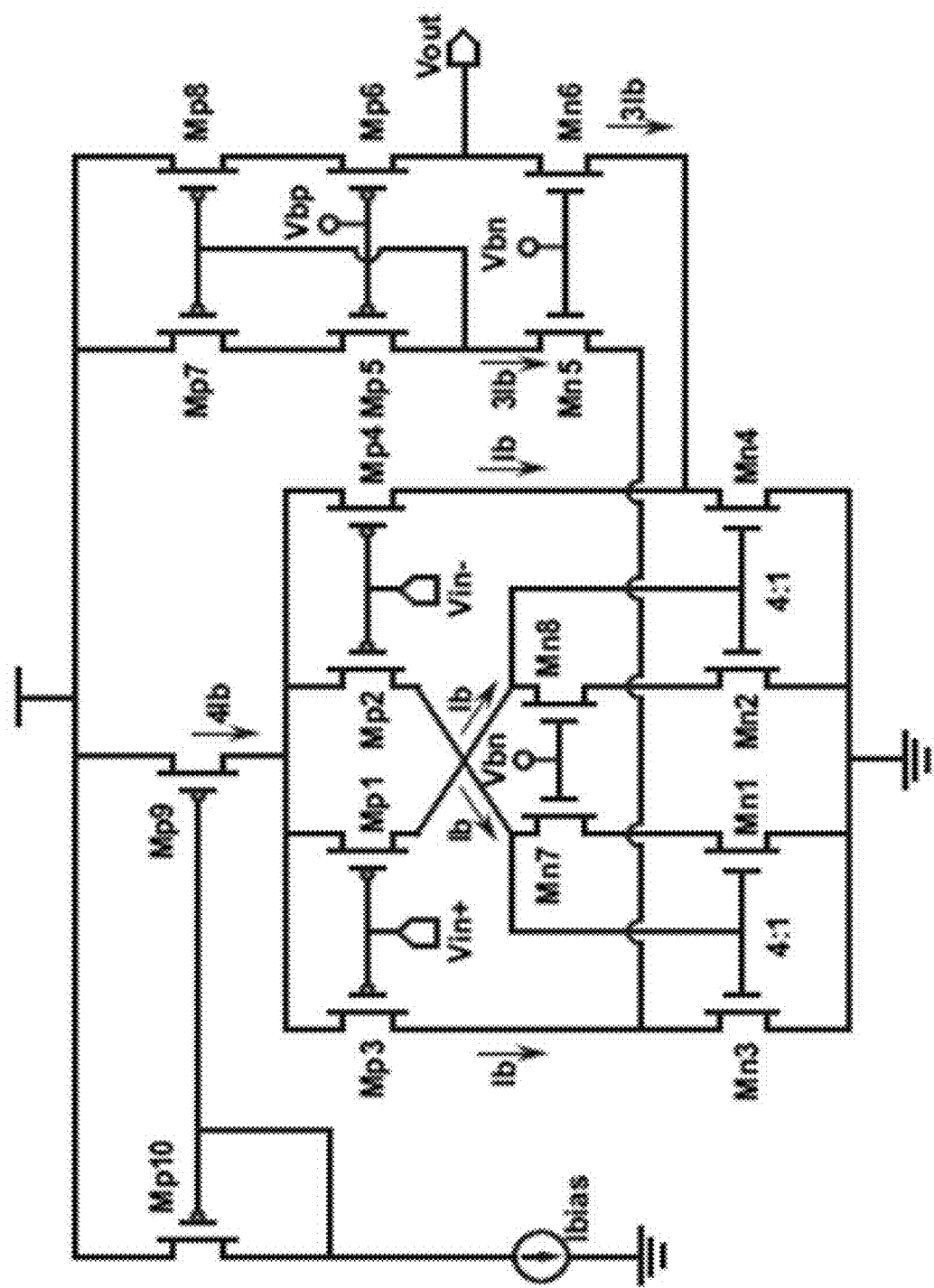
FIG. 12 is a schematic diagram of an operational transconductance amplifier ("OTA") used in the Delta modulator according to an embodiment of the present invention.

A schematic diagram of an operational transconductance amplifier ("OTA") that can be used in the Delta modulator is illustrated in FIG. 12. The recycling folded cascode architecture enhances the transconductance, gain and slew rate of this one stage amplifier, which makes it a good choice for integrators with low power consumption and low design complexity. In phase φ2, the gain-bandwidth ("GBW") product of the OTA is GBW=$\beta G_m/C_L$. Here, $G_m$ is the transconductance of the OTA; $\beta=C_i(C_i+C_s+C_p+C_{sub})$ is the feedback factor. $C_p$ (less than 0.1 pF) is the OTA input parasitic capacitance; $C_L=C_{sub}+(1-\beta)C_i+C_{pl}$ is the total load capacitance; $C_{pl}$ (less than 0.1 pF) is the load parasitic capacitance.

Figure 13:
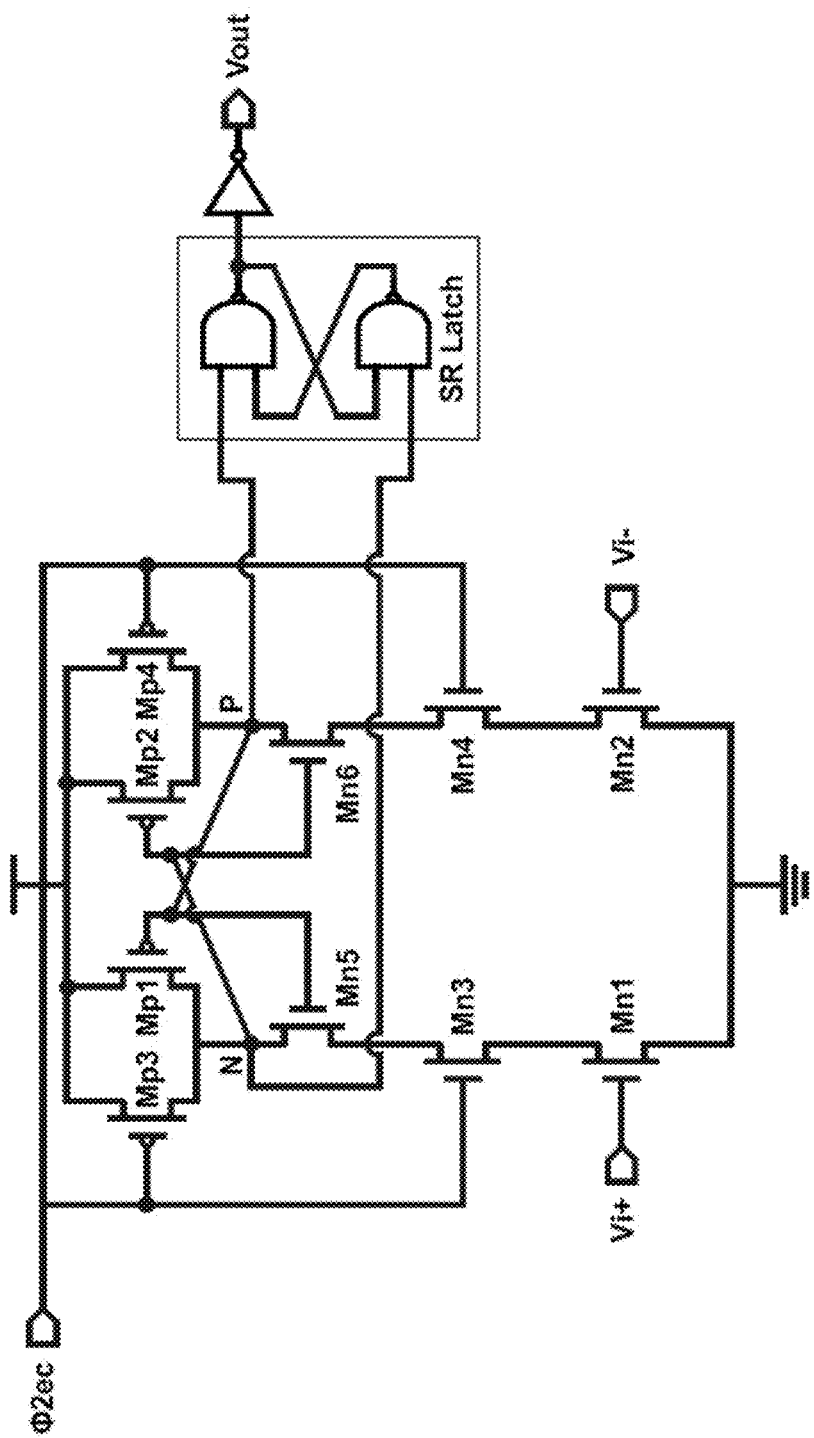
FIG. 13 is a schematic diagram of a comparator based on a 1-bit fourth-order delta sigma modulator in accordance with an embodiment of the present invention

FIG. 13 illustrates a schematic diagram of a comparator design based on a 1-bit fourth-order Delta-Sigma modulator. The comparator has a dynamic latch and an SR latch. Very low static power is consumed because of the pseudo-differential topology. When the positive edge of φ2ec comes, Mn3 and Mn4 are turned on. With the help of pre-charged voltage at node N and node P, the dynamic latch (Mp1, Mn5, Mp2, Mn6) pushes node N and node P to the rails based on the input. When φ2ec is low, node N and node P are both charged to VDD. The SR latch secures the previous decision of the comparator.

QRS and PT Wave Detection Algorithms

A. QRS Complex Detection Algorithm

In one embodiment, the bitstream processing algorithm is preferably based on counting the number of pulses in a moving window, without performing addition and multiplication, such as in the wavelet transform algorithm. The features extracted from the counting results can be used in machine learning algorithms like support vector machines. The digital counting circuits use much less power than the multiply-and-accumulate circuits at the same clock frequency. The arrhythmia classification algorithm can use the location of the fiducial points and the pulse density modulation from the Delta modulators to detect arrhythmias.

Figure 14:
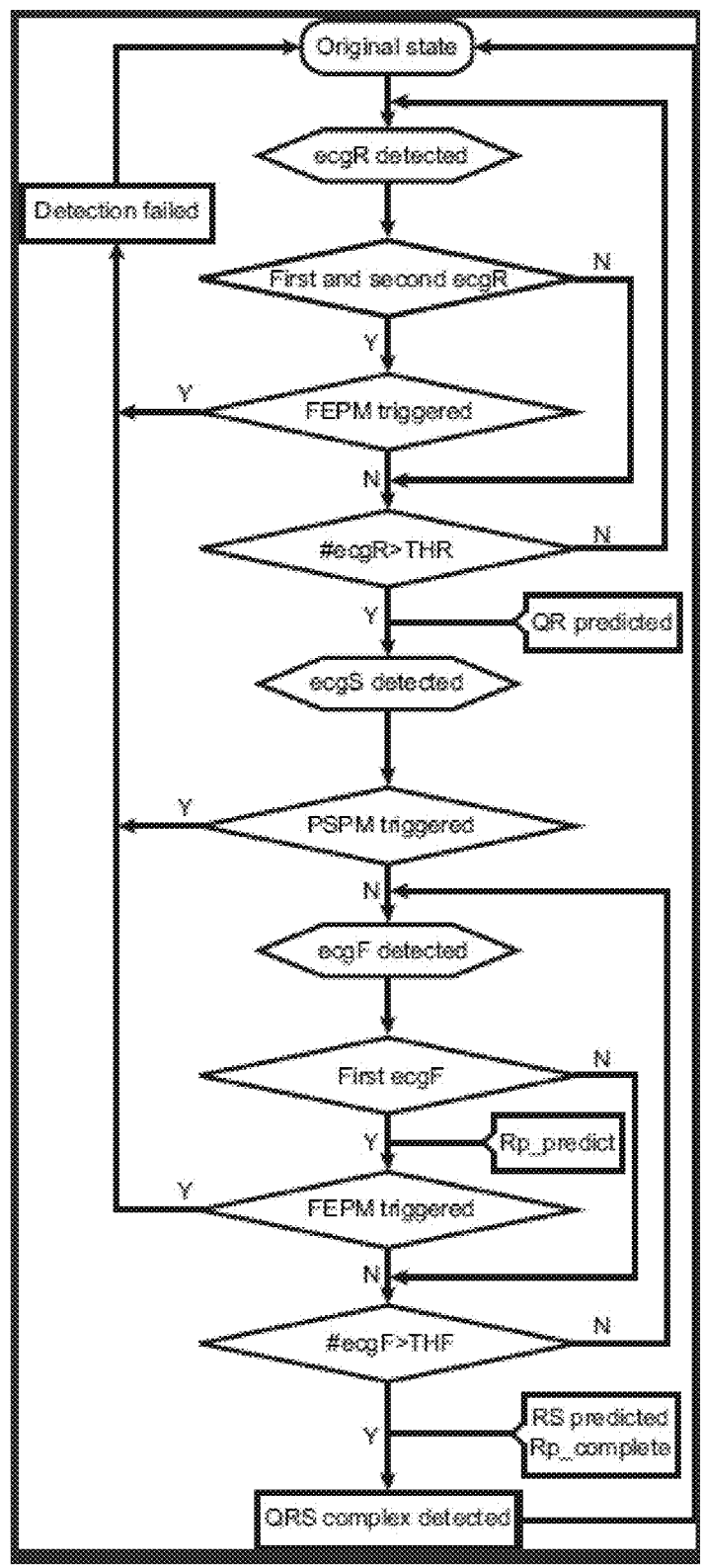
FIG. 14 is a QRS detection load maximum point ("LMaP") algorithm flowchart according to an embodiment of the present invention.

In one embodiment, a Local Maximum Point ("LMaP") algorithm is preferably used to detect QRS complex directly from the Delta-modulated bitstream. An algorithm flow chart is illustrated in FIG. 14. The algorithm preferably has two steps. Step one detects the rising edge of the R wave while step two detects the falling edge of the R wave to complete the QRS detection.

In a preferred first step, the trigger reference voltage and integration gain of the Delta modulator, Delta-qrs, is preferably optimized so that Delta-qrs is sensitive to a large rising slope, for example that of the Q-R segment. Also, the Q-R slope preferably does not overload the Delta modulator, in order to allow accurate detection of Rpeak in the time domain. The LMaP algorithm starts by detecting an ecgR label, which indicates a potential beginning of a QRS complex. Then, a counter starts counting the number of consecutive ecgR labels, which is preferably marked as $P_{rise}$, and that number is then compared with a threshold value for a rising slope ("THR"), which can be from observation of simulation results. Once the number of consecutive ecgR labels is higher than THR, the algorithm preferably makes an assumption that a Q-R segment is detected (QRpredicted). During this process, if an ecgF label is detected, then the detection is preferably marked as failed, and the algorithm is preferably reset to the original state. Moreover, if the duration between the first and second ecgR, or between the second and third ecgR is more than a pre-defined value, the algorithm also preferably resets the process to the original state. This process is preferably the first ecgR protection mechanism ("FEPM"). FEPM preferably protects the algorithm so that it is sensitive to only large rising slopes. By doing so, sparse ecgR sequences, which indicates small rising slopes, are ignored by the algorithm to prevent false detection.

In a preferred second step, based on the ECG morphology, around the peak of the R wave, the slope is reduced to a small value. Thus, a sequence of ecgS labels appears if there are enough sampling points, which are preferably marked as $P_{stay}$. Then, the following Q-R segment contains a sequence of ecgF labels, which is preferably marked as $P_{F\,all}$. Similar to step one, the algorithm preferably counts the number of the consecutive ecgF labels and compares the number to a threshold value obtained from simulation of the falling edge ("THF"). Once the number of consecutive ecgF labels reaches THF, the complete QRS complex is detected. Once $P_{F\,all}$ happens after a QR predicted label, a predicted R peak label (Rp predict) is preferably marked on the first ecgF location. After the complete falling edge of the R wave, a complete R peak label Rp complete is preferably marked to declare the full detection of the QRS complex. Otherwise, if there is no Rp complete label within a certain time after the Rp predict label, the Rp predict label is preferably removed. This means the detection has failed, in which case, the algorithm is preferably returned to its original status. To prevent large baseline drifts of the EGG wave form triggering the QRS detection process, a $P_{stay}$ state protection mechanism ("PSPM") is preferably provided. With PSPM, when the algorithm is entered in the $P_{stay}$ state, a counter preferably starts to count with the sampling clock up to a pre-defined period. If no $P_{F\,all}$ happens during the period, the algorithm also preferably resets to its original state.

B. P and T Wave Detection Algorithm

Figure 4:
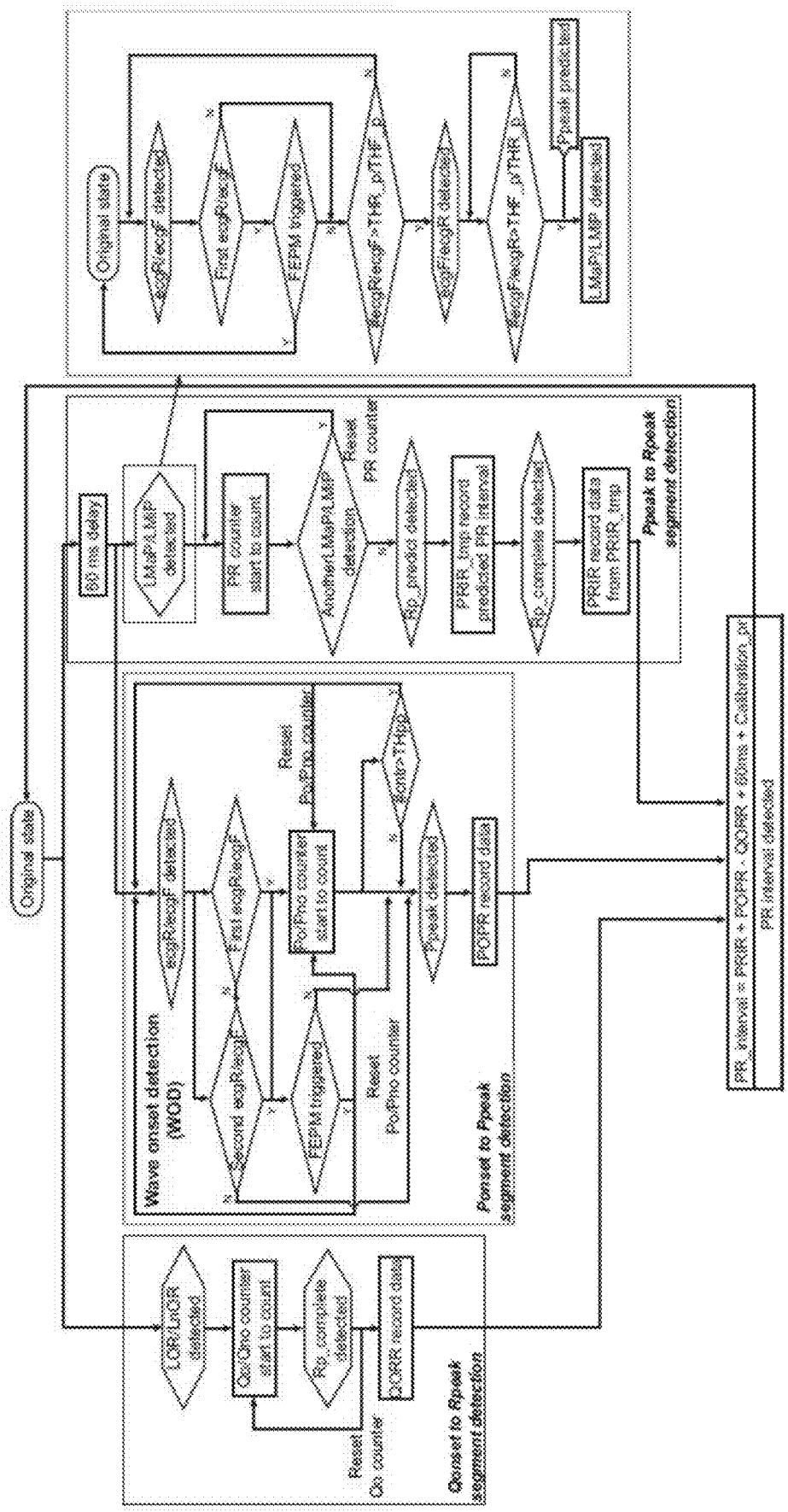
FIG. 4 is a flowchart illustrating P and PR interval detection according to an embodiment of the present invention.

P Wave Detection Algorithm: The P wave detection circuit preferably implements the P wave detection algorithm to process the Delta modulated bitstream from the Delta modulator Delta pt. Because the Delta pt is sensitive to low-amplitude and slow-variation of the input signal, compared to the QRS detection algorithms, the P wave detection algorithm handles more local maximum points. A flowchart of the P wave detection algorithm of an embodiment of the present invention is illustrated in FIG. 4. In one embodiment, the LMaP detection algorithm used in the P wave detection is similar to the QRS complex detection except that different threshold values THR_p and THF_p are applied instead of THR and THF.

Figure 15:
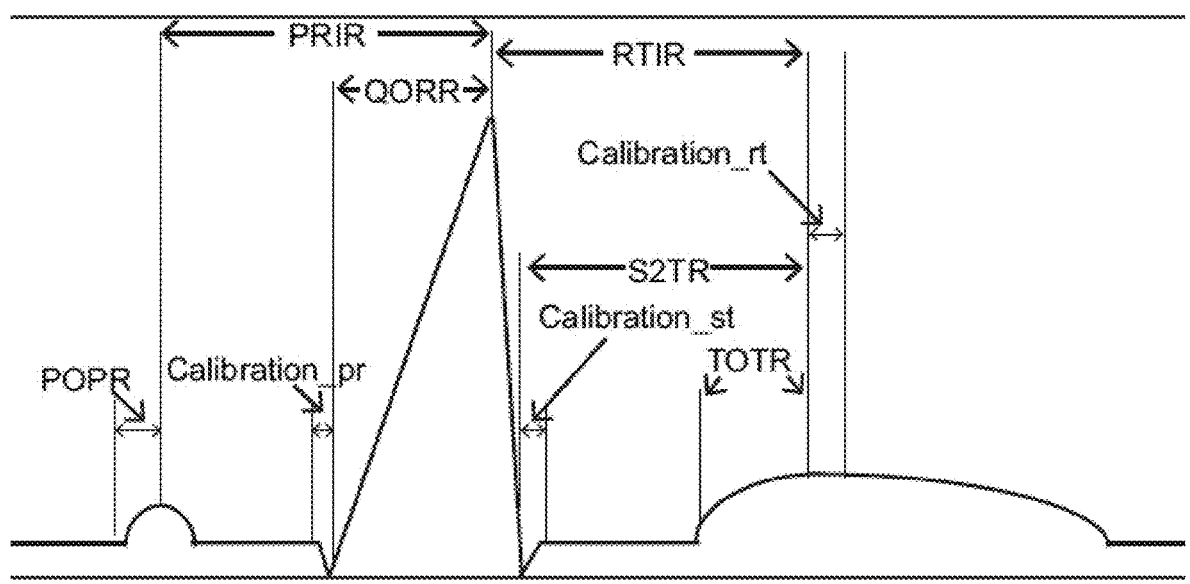
FIG. 15 is a graph which illustrates timing and register values according to an embodiment of the present invention.

Another important task of the P wave detection circuit is to measure the PR interval. The PR interval measurement, in an embodiment of the present invention, preferably records three timing information aspects: P wave peak ($P_{peak}$) to R wave peak ($R_{peak}$), P wave onset ($P_{onset}$) to $P_{peak}$, and Q wave onset ($Q_{onset}$) to $R_{peak}$. For $P_{peak}$-$R_{peak}$ and $P_{onset}$-$P_{peak}$ segments, the input data from Delta-pt is preferably delayed about 60 ms to avoid the influence from QRS complex in the P wave detection algorithm. Because the QRS complex can also be detected as LMaP from Delta-pt, the 60 ms delay acts as a protection window so that QRS complex will not trigger LMaP in the P wave detection. After the delay, a counter (PR counter) preferably starts counting when the algorithm meets the first LMaP and restarts counting when it meets the next LMaP. A $P_{peak}$-$R_{peak}$ Interval Register ("PRIR") preferably records the counted value at the appearance of the Rp predict label. A wave onset detection ("WOD") block can be applied to detect the $P_{onset}$-$P_{peak}$ segment. A $P_{onset}$ counter (Po counter, the negative P wave uses a Pno counter) preferably starts counting when it meets the first ecgR until the $P_{peak}$ is detected. Then, the data is recorded in the $P_{onset}$-$P_{peak}$ Register ("POPR"). Similar to QRS complex detection, a FEPM is preferably applied to limit the first and second ecgR. The value of the Po/Pno counter ("#cntr") is compared to a programmable threshold (THpp) value, so that if the recorded $P_{onset}$-$P_{peak}$ is too large, the algorithm resets to its original state to avoid a false detection. Similarly, negative P wave onset ("Pno") detection can also be achieved using a Pno counter. For $Q_{onset}$-$R_{peak}$ detection, the long ones register ("LOR") and the long negative ones register ("LnOR") are preferably used to detect the starting point of the Q-R segment, which results in continuous ecgRs or ecgFs without interruption by the easy-to-saturation feature of Delta-pt. Once the Q-R segment onset is detected, $Q_{onset}$ and negative $Q_{onset}$ counter ("Qo/Qno counter") preferably starts to count until Rp_complete comes, and data is then recorded in $Q_{onset}$-$R_{peak}$ Register ("QORR"). Finally, the PR interval register ("PR_interval") preferably obtains the value of the PR interval from computing an equation PR_interval=PRIR+POPR-QORR+60 ms+Calibration_pr. Here, Calibration_pr is preferably used to compensate the timing error between Q wave onset and the starting point of the Q-R segment, as illustrated in FIG. 15. Then, the value of PR_interval is preferably sent to the following PR interval warning generation block ("WGB") when Rp_complete is identified.

A special case in P wave is that the P wave has an opposite polarity. This can happen due to atrial tachycardia. In such cases, LMaP is not able to detect such P waves. Therefore, a complementary Local Minimum Points ("LMiP") algorithm is preferably introduced to detect the opposite polarity P waves. LMiP detects $P_{F\_all}$ first, and then $P_{stay}$ and $P_{Rise}$ with corresponding THF_p and THR_p values. The LMiP algorithm is preferably run in parallel with the LMaP algorithm in different circuits. The LMiP circuit has its own PR interval register PRIR_N measuring the PR interval and sending the value to the WGB.

In addition, atrial flutter or other arrhythmic symptoms may introduce fast P waves, and sinus exit block or other arrhythmia may cause missing P waves, which make the PRIR value out of PR interval limit. To handle such cases, when Rp complete comes, WGB preferably first compares the PRIR value with the pre-defined PR interval limit values. If the measured PR interval is within the range of the pre-defined limits, WGB preferably keeps the value, Otherwise, WGB preferably sends the value to a temporal register and then fetches the value from PRIR_N, and compares the value with the limit range again. If the value from PRIR_N is in the range, WGB uses the value from PRIR_N. Otherwise, WGB takes the value back from the temporal register. In summary, in P wave detection, normal or fast P waves are detected first. If no normal or fast P waves are detected, the algorithm preferably seeks an opposite polarity P wave. If still no P waves are found, the WGB preferably marks the result as "long distance P wave" or "missing P wave". In each case, WGB generates different warning signals according to the detection result.

Figure 16:
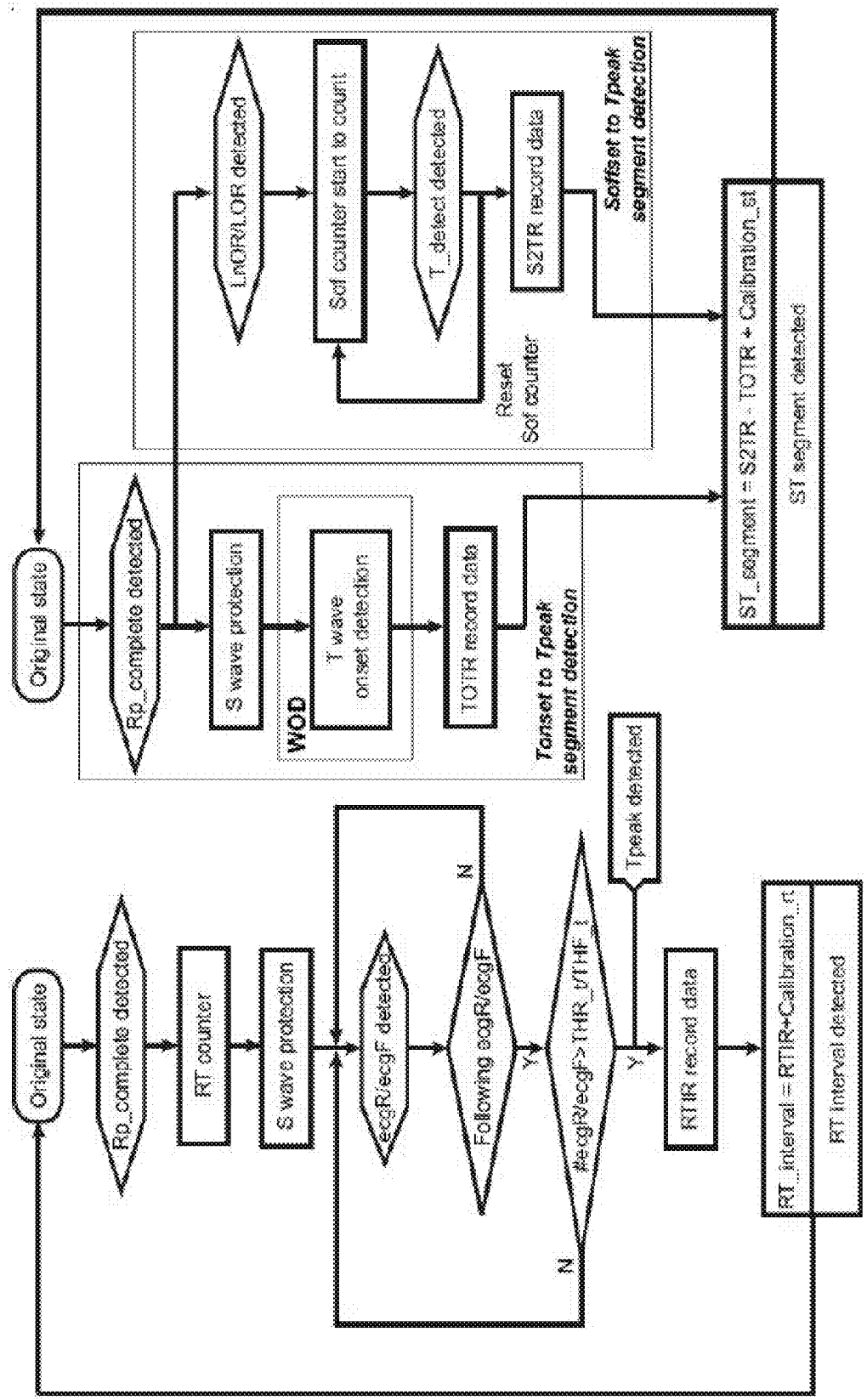
FIG. 16 is a flowchart of T wave and RT interval, ST segment detection according to an embodiment of the present invention.

T Wave Detection Algorithm: T waves are more recognizable than P waves because T waves have relatively larger amplitude and longer duration compared to P waves. Therefore, the T wave detection algorithm is much simpler. As illustrated in FIG. 16, after the detection of QRS complex, a counter preferably starts counting until a pre-defined number of ecgR or ecgF labels is reached, which indicates that there is a rising or descending slope, and then sends data to RT interval register ("RTIR"). This can be seen as an appearance of the T wave (T_detect), and according to the polarity of the label, T wave polarity information (T_polarity) is sent out. Because the ECG morphology may have patient-to-patient variation, a programmable calibration register Calibration_rt is preferably applied to compensate for the difference between the detected T wave and the real T wave locations. Finally, the RT interval register (RT_interval) preferably records RT interval data by computing the equation RT_interval=RTIR+Calibration_rt.

Similar to $P_{onset}$-$P_{peak}$ segment measurement, the same wave onset detection algorithm is preferably applied to measure the timing from T wave onset ($T_{onset}$) to T wave peak ($T_{peak}$) and the value is preferably recorded in the $T_{onset}$-$T_{peak}$ Register ("TOTR"). After Rp complete is detected, another pair of LnOR/LOR is preferably used to detect the offset point of the R-S segment. Then, the S offset counter (Sof counter) preferably starts to count until T_detect to acquire the timing value from S wave offset ($S_{offset}$) to $T_{peak}$, and records the value in the $S_{offset}$-$T_{peak}$ register ("S2TR"). Finally, the ST segment recording register ("ST_segment") preferably records the ST segment by computing the equation ST_segrnent=S2TR−TOTR+Calibration_st. Here, Calibration_st is preferably used to compensate the timing error between the R-S segment offset and the $S_{offset}$ as illustrated in FIG. 14.

Embodiments of algorithms LMaP and LMiP are different from some other QRS detection algorithms, such as pulse-triggered ("PUT"), time-assisted PUT ("t-PUT"), and input-feature-correlated ("IFC"). For example, an embodiment of the present invention can provide on-sensor signal processing to measure PR and RT intervals, and ST segments, without recovering the original signal. Moreover, embodiments of the present invention can introduce FEPM and PSPM to alleviate the challenge of signal baseline drifts, because low-frequency baseline drifts only generate very sparse ecgRs and ecgFs that would not change the processing state in LMaP and LMiP algorithms. A parallel algorithm for detecting a negative slope before a positive slope is also preferably provided, and in one embodiment it only operates when there is no normal QRS complex found.

In one embodiment, the detection system of the present invention can detect and determine PR and RT intervals, as well as ST segment measurements while using an average of less than 10 µW of power and more preferably an average of less than 1,000 nW of power.

INDUSTRIAL APPLICABILITY

The invention is further illustrated by the following non-limiting examples.

Example 1

A system according to an embodiment of the present invention was constructed and was used to analyze simulated datasets.
D, P and T Wave Detection Algorithms Evaluations Embodiments of the present P and T wave detection algorithms were evaluated using 103 records from the QT Database. The QT Database contains a total of 105 records. Two records (sel35 and sel37) were not used in the evaluation due to the lack of professional manual annotations of the P and T waves. The most preferred data sources in the evaluation are MLII and V5, because the ECG signals from MLII and V5 have high amplitude and clear QRS complex, with more distinguishable P and T waves.

The complete simulation results of the P and T wave detection are illustrated in the table of FIG. 17. The results of PR interval, RT interval and ST segment are illustrated in the table of FIG. 18. All records with notated $P_{onset}$ and $Q_{onset}$ (97 records), $R_{peak}$ and $T_{peak}$ (103 records), and $S_{offset}$ and $T_{onset}$ (45 records) from the QT Database were used to evaluate PR, RT interval and ST segment, respectively. Using an algorithm of the present invention, the performance in T wave detection is better than in the P wave detection.
Measurement Results The three-state parallel Delta modulator chip was fabricated with a 0.13 µm CMOS process. The core silicon area was 520×560 µm². The power supply voltage was ±0.6 V, The designed integration gains of Delta-qrs and Delta-pt were 0.04166 and 0.02083, respectively. The reference voltage of Delta-qrs and Delta-pt were set to ±70 mV and ±20 mV, respectively. With a 1 kHz sampling clock, the measured power consumption of the parallel Delta modulator was 720 nW. The digital processing circuits for QRS and PT wave detections were implemented in a Xilinx Spartan-6 FPGA board on an Opal Kelly XEM6001 module.

Figure 19:
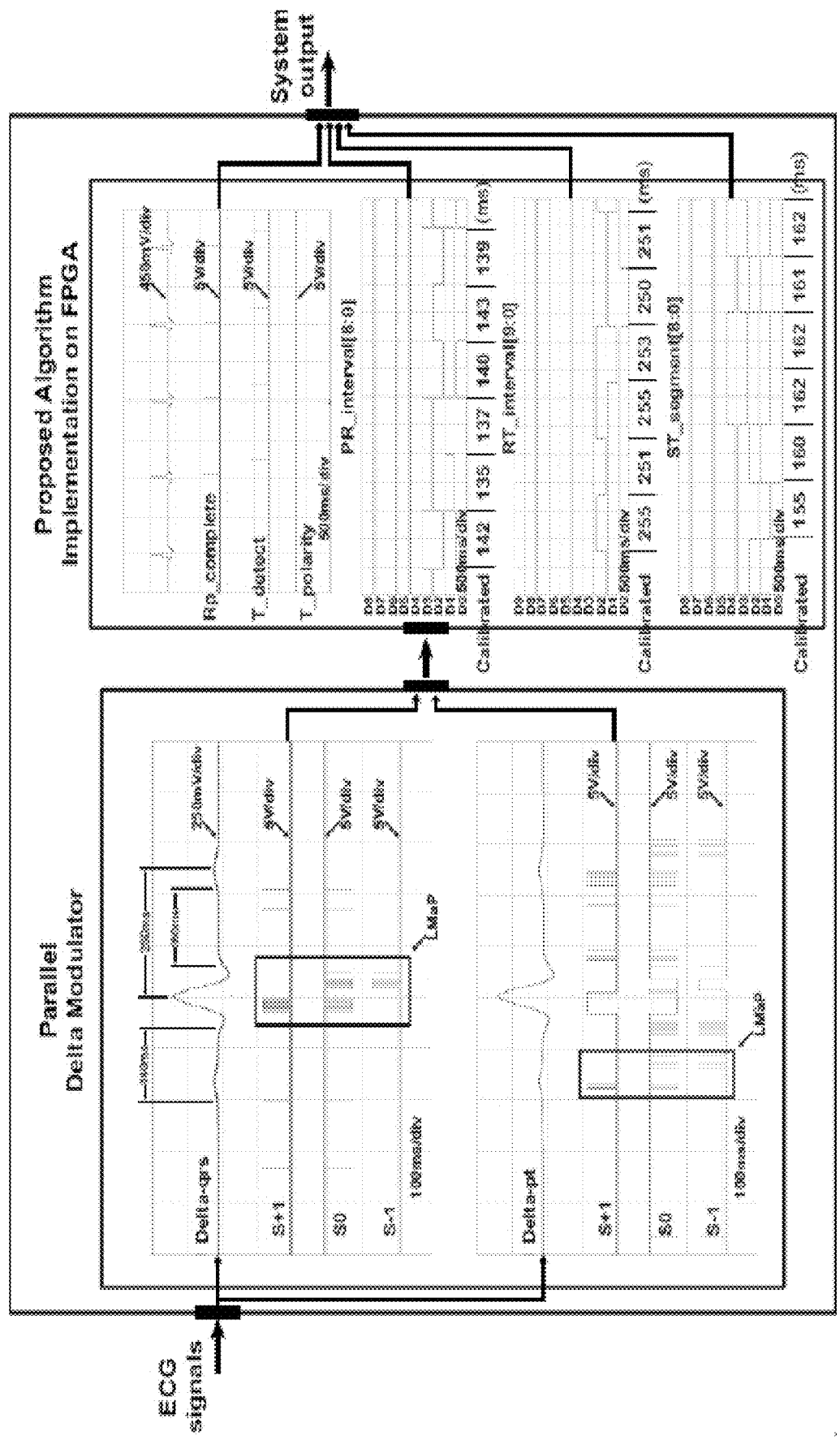
FIG. 19 is a graph depicting measured results of an experiment of an embodiment of the present invention.

In the test of the hardware prototype, the input ECG signal came from a Rigol DG4102 signal generator with 0.4 $V_{PP}$ and 60 beats-per-minute ("bpm") heart rate. The output of the system included the detected QRS sign, P wave sign, T wave sign, and the wave polarities of the P waves and T waves. The system also measured PR intervals, RT intervals, and ST segments. The waveforms recorded from the oscilloscope in the experiment are illustrated in FIG. 19. The PR interval of the input ECG signal was around 140 ns, the RT interval was around 250 ns, and the ST segment was around 160 ins.

In the test, the reading of the average PR interval was 152.7 ms, taking a −13 ms from the programmable patient-specific Calibration_pr, so the average recorded PR interval from the prototype was 139.3 ms. In the RT interval measurement, the average recording reading of the RT interval was 212.5 ms and the patient-specific Calibration_rt delay was set at 40 ms. So, the total average RT interval was 252.5 ms. In the ST segment measurement, the average recording value was 174.3 ms and the calibrated value is 160.3 ms with Calibration_st equaled −14 ms.

A. Performance Evaluation

Figure 20:
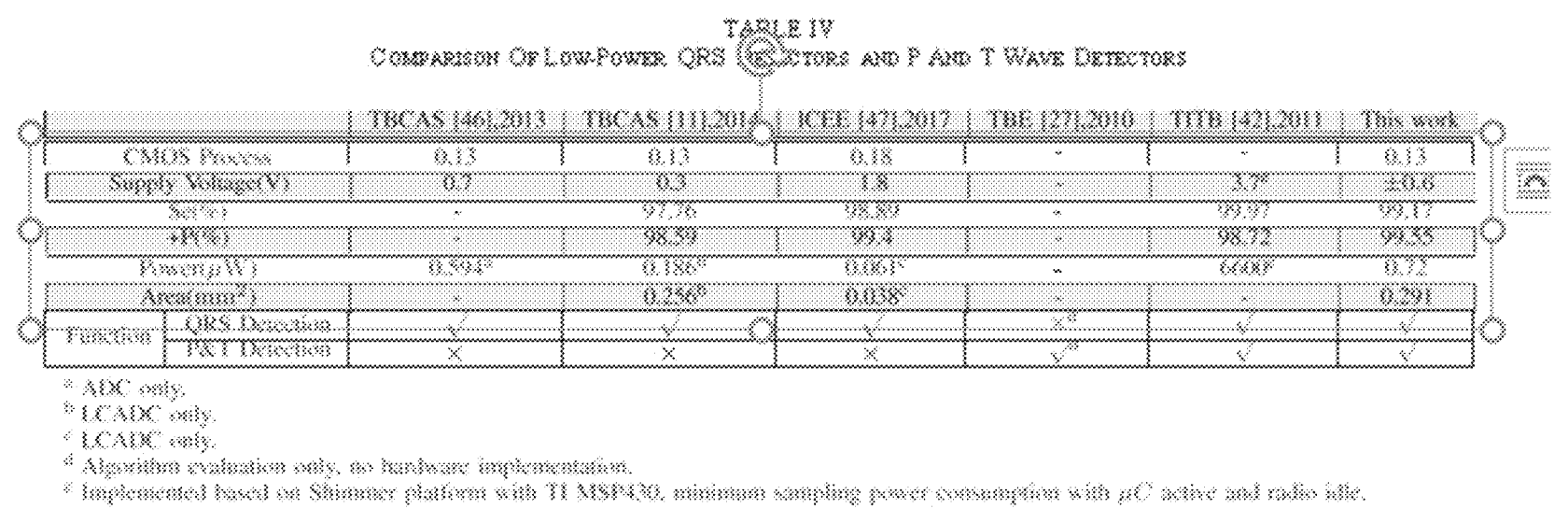

Table IV of FIG. 20 compares these results with the state-of-the-art QRS and PT wave detection systems. For QRS detection, although asynchronous Delta modulators have very low power consumption, embodiments of the present invention achieve accuracy in QRS detection. In addition, embodiments of the present invention are able to detect P and T waves, and measure PR, RT intervals and ST segments. On the other hand, compared to other P and T wave detection algorithms, embodiments of the present invention achieve reasonably good accuracy, while providing low complexity algorithms that can be implemented on hardware.

B. Discussions

Embodiments of the present invention provide a Delta modulator-based ECG monitor with the capability of low power on-sensor measurement of PR/RT intervals and ST segments. These features can enable future studies of long-term ECG recording involving PR/RT/ST measurements while avoiding continuous raw data transmission, which is power consuming. Specifically, embodiments of the present invention can improve the sensitivity of automatic arrhythmia detection algorithms in intermittent monitoring systems. Biasing circuits, fully differential front-end circuits and buffers in analog front-end can be added to embodiments of the present invention to reduce the effects of power supply noise. Embodiments of the present invention can preferably be calibrated for patient-specific physical activities and other factors that can affect accuracy and problems of onset and offset detection of the first-derivative based algorithm. Embodiments of the present invention can include special detection models for certain arrhythmias, such as premature ventricular contractions ("PVCs") and/or premature atrial contractions ("PACs").

Example 2, QRS Complex Detection Algorithms Evaluations

Figure 21:
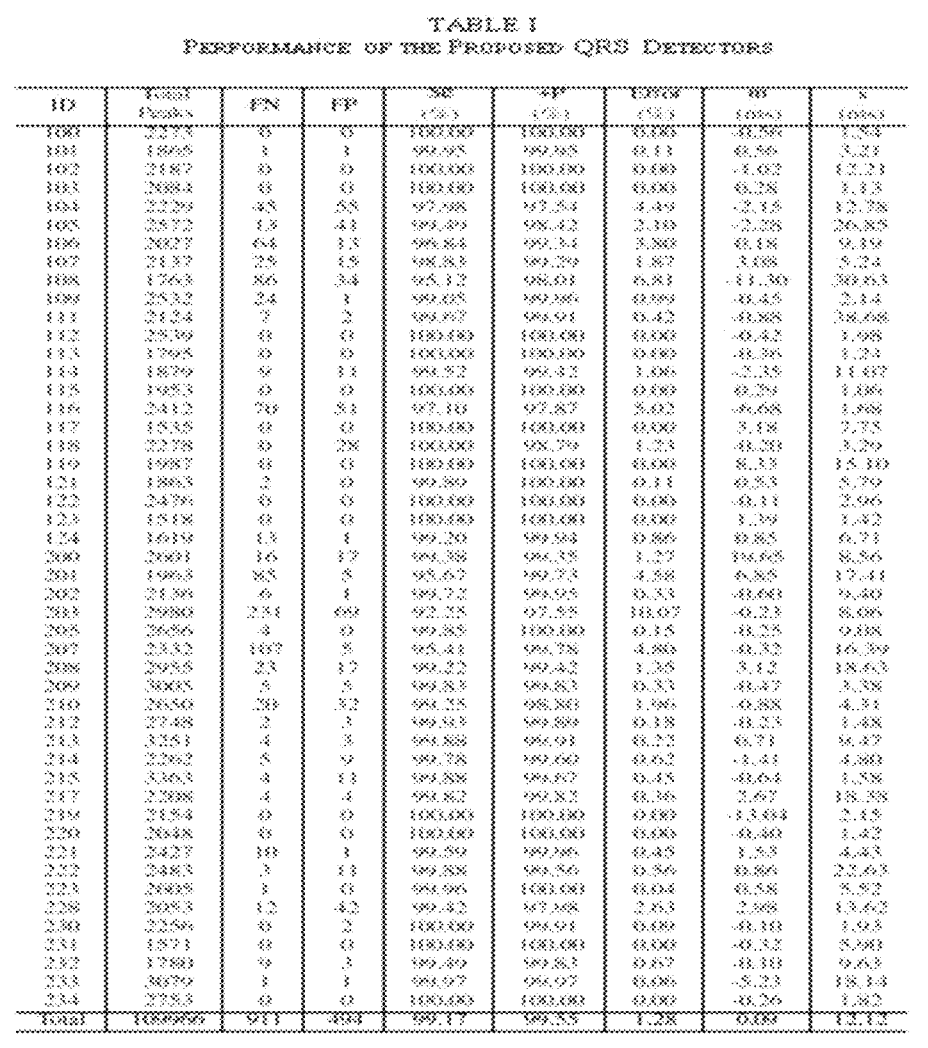

The QRS detection algorithm of an embodiment of the present invention was evaluated by all 48 records in the MIT-BIH Arrhythmia Database. The complete simulation results are illustrated in the table of FIG. 21. Three parameters (Se, +P, and Error) were simulated to evaluate the performance of the algorithm. The sensitivity ("Se") represents the capability of the algorithm to correctly detect the QRS complex. The positive prediction ("+P") illustrates the discriminability of the algorithm in detecting true and false QRS complexes. The detection error rate ("Error") stands for the accuracy. Also, to measure the time error of R peak detection, "m" represents the mean errors in time domain between the cardiologist annotations and the detection by the proposed algorithm. Also, "s" stands for the average of the intra-recording standard deviations.

$$Se\ (\%) = \frac{TP}{TP + FN} \quad (2)$$

$$+P\ (\%) = \frac{TP}{TP + FP} \quad (3)$$

$$Error\ (\%) = \frac{FN + FP}{TP + FN} \quad (4)$$

where TP is the number of true positive detections, FN is the number of false negative detections, and FP stands for the number, of false positive detection errors. The overall sensitivity and positive prediction were both above 99%. Except for one record (203), all other 47 records were above 95% for Se. The overall mean error and average intra-recording standard deviation was 0.09 ms and 12.12 ms, respectively. All records had positive predictions greater than 97%.

In one embodiment, the parallel Delta modulator chip was fabricated with 0.13 µm CMOS technology with ±0.6 V power supply voltage. The chip consumed 720 nW with a sampling rate of 1 kHz. The system was verified through simulations using data from the MIT-BIH Arrhythmia Database and the QT Database. The system was found to achieve 99.17%, 91.12%, and 98.36% sensitivity and 99.55%, 92.44% and 98.99% predictivity for QRS complex, P wave, and T wave detections, respectively, and the respective mean errors and intra-recording standard deviations were 0.18±17.47 ms, 2.13±17.02 ms and 0.5±1995 ms for PR interval, RT interval and ST segment detections respectively. The hardware prototype system was found to perform real-time PR and RT interval, and ST segment measurements.

Note that throughout this application, the term "about" means within twenty percent (20%) of the numerical amount cited.

Embodiments of the present invention can include every combination of features that are disclosed herein independently from each other. Although the invention has been described in detail with particular reference to the disclosed embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference. Unless specifically stated as being "essential" above, none of the various components or the interrelationship thereof are essential to the operation of the invention. Rather, desirable results can be achieved by substituting various components and/or reconfiguration of their relationships with one another.

What is claimed is:

1. An electrocardiogram sensing and processing apparatus comprising:
 a second-order Delta modulator circuit configured to subtract an integrated feedback voltage from an electrocardiogram signal and to generate a delta voltage, wherein the second-order Delta modulator circuit comprises a parallel Delta modulator circuit which comprises a pair of second-order Delta modulator circuits arranged in parallel with one another such that a first Delta modulator circuit of said pair of second-order Delta modulator circuits is configured to process a bit stream from a QRS wave and a second of said pair of second-order Delta modulator circuits is configured to process a bit stream from a PT wave; and non-transitory computer-readable media comprising a digital logic algorithm stored thereon, said digital logic algorithm configured to provide delineation to extract at least a plurality of fiducial points from the electrocardiogram signal during analog to digital conversion comprising Delta modulated bitstreams.

2. The electrocardiogram sensing and processing apparatus of claim 1, wherein said second-order Delta modulator circuit is configured to convert the electrocardiogram signal into two digital bitstreams, wherein a first of the two digital bitstreams represents a rising slope of the electrocardiogram signal and wherein a second of the two digital bitstreams represents a falling slope of the electrocardiogram signal.

3. The electrocardiogram sensing and processing apparatus of claim 2, wherein the two digital bitstreams control a feedback voltage switch and wherein the feedback voltage switch is configured to control a feedback voltage and wherein the feedback voltage is integrated in an integrator.

4. The electrocardiogram sensing and processing apparatus of claim 1, wherein said second-order Delta modulator circuit further comprises a tri-state comparator.

5. The electrocardiogram sensing and processing apparatus of claim 1, wherein said electrocardiogram sensing and processing apparatus is configured to record at least two fiducial points selected from the list consisting of an onset, peak, and end points of any one or more items selected from a list consisting of P, Q, and R waves of the electrocardiogram signal.

* * * * *